(12) United States Patent
Kurz et al.

(10) Patent No.: US 11,521,263 B2
(45) Date of Patent: Dec. 6, 2022

(54) INTERACTIVE REMOTE SELECTION AND ORDERING OF WHOLESALE FASHION ITEMS

(71) Applicant: CXN, Inc., Las Vegas, NV (US)

(72) Inventors: Jutta S. Kurz, Las Vegas, NV (US); Robert Marc Meadows, Las Vegas, NV (US); Paul Ritter, Las Vegas, NV (US); Mona Fawzy, Las Vegas, NV (US); Michael Zolfo, Las Vegas, NV (US); Yvonne Lao, Las Vegas, NV (US)

(73) Assignee: CXN, Inc., Las Vegas, NV (US)

( * ) Notice: Subject to any disclaimer, the term of this patent is extended or adjusted under 35 U.S.C. 154(b) by 0 days.

(21) Appl. No.: 17/155,052

(22) Filed: Jan. 21, 2021

(65) Prior Publication Data

US 2021/0224888 A1   Jul. 22, 2021

Related U.S. Application Data

(60) Provisional application No. 62/964,246, filed on Jan. 22, 2020.

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06F 3/0481* (2013.01); *G06F 3/0486* (2013.01);
(Continued)

(58) Field of Classification Search
CPC ............... G06Q 30/00; G06Q 30/0601; G06Q 30/0623; G06Q 30/0641; G06Q 30/0643
See application file for complete search history.

(56) References Cited

U.S. PATENT DOCUMENTS 5,930,769 A * 7/1999 Rose .................. G06Q 30/06
                                                       705/26.81
6,201,546 B1 * 3/2001 Bodor .................. G06T 7/40
                                                       345/620
(Continued)

FOREIGN PATENT DOCUMENTS

WO        2014168710        10/2014

OTHER PUBLICATIONS

Schoenmakers, Kim, Lisette Vonk, and Hein Daanen. "The effect of 3D virtual garment presentation on the consumer experience in brick and mortar stores." Amsterdam University of Applied Sciences. 2018. (Year: 2018).*

(Continued)

*Primary Examiner* — Christopher B Seibert
(74) *Attorney, Agent, or Firm* — Steven Stupp

(57) ABSTRACT

A computer that simulates a real-world showroom experience for a wholesale buyer is described. During operation, the computer may receive information corresponding to first user-interface activity associated with an electronic device, where the user-interface activity indicates selections of the wholesale buyer of fashion items in a first user interface. Then, the computer may generate instructions for a second user interface based at least in part on the first user-interface activity, where the second user interface corresponds to a virtual showroom of the wholesale buyer, the second user interface includes the selected fashion items and a clothes rack with available hangers, and wherein the second user interface allows the wholesale buyer to dynamically assemble one or more groups of the selected fashion items on one or more of the available hangers. Next, the computer may provide the instructions for the second user interface addressed to the electronic device.

20 Claims, 20 Drawing Sheets

(51) Int. Cl.
  G06F 3/0486      (2013.01)
  G06F 3/0481      (2022.01)
  G06F 3/04842     (2022.01)
(52) U.S. Cl.
  CPC ..... G06F 3/04842 (2013.01); G06Q 30/0623 (2013.01); G06Q 30/0631 (2013.01); G06Q 30/0635 (2013.01)

(56) References Cited

U.S. PATENT DOCUMENTS

| | | | | |
|---|---|---|---|---|
| 6,344,853 | B1* | 2/2002 | Knight | G06Q 30/02 345/629 |
| 6,546,309 | B1* | 4/2003 | Gazzuolo | G06T 17/20 702/167 |
| 8,311,967 | B1 | 11/2012 | Lin et al. | |
| 10,046,234 | B2* | 8/2018 | Perdigón Rodriguez | G06F 3/011 |
| 2002/0126132 | A1* | 9/2002 | Karatassos | G06T 19/00 345/586 |
| 2003/0076318 | A1* | 4/2003 | Shaw-Weeks | A41H 1/00 345/419 |
| 2007/0005174 | A1* | 1/2007 | Thomas | G06Q 30/02 700/132 |
| 2007/0027564 | A1* | 2/2007 | Walters | G06Q 10/06 703/1 |
| 2007/0130020 | A1* | 6/2007 | Paolini | G06Q 30/0643 705/26.62 |
| 2007/0162348 | A1* | 7/2007 | Lewis | G06Q 30/0605 705/17 |
| 2008/0163344 | A1* | 7/2008 | Yang | G06Q 30/0201 705/7.29 |
| 2008/0255920 | A1* | 10/2008 | Vandergrift | G06Q 30/0601 705/26.1 |
| 2009/0115777 | A1* | 5/2009 | Reyers Moreno | A41H 1/02 348/121 |
| 2010/0061596 | A1* | 3/2010 | Mostafavi | A61B 5/113 382/209 |
| 2010/0063419 | A1* | 3/2010 | Mostafavi | A61B 90/36 600/587 |
| 2010/0306082 | A1* | 12/2010 | Wolper | G06Q 30/0603 345/619 |
| 2012/0022978 | A1* | 1/2012 | Manea | G06Q 30/0603 705/27.2 |
| 2013/0215116 | A1* | 8/2013 | Siddique | G06Q 20/40 705/26.7 |
| 2014/0114620 | A1* | 4/2014 | Grinspun | A41H 3/007 703/1 |
| 2014/0168217 | A1* | 6/2014 | Kim | G06T 19/20 345/420 |
| 2014/0368499 | A1* | 12/2014 | Kaur | G06T 19/20 345/420 |
| 2015/0088687 | A1* | 3/2015 | Lin-Hendel | G06Q 30/0603 705/26.8 |
| 2015/0154691 | A1* | 6/2015 | Curry | G06Q 30/0631 705/27.2 |
| 2016/0210602 | A1 | 7/2016 | Dressbot et al. | |
| 2016/0284017 | A1* | 9/2016 | Almog | G06K 9/6215 |
| 2017/0004567 | A1* | 1/2017 | Dutt | G06Q 30/0643 |
| 2018/0130122 | A1 | 5/2018 | Lin-Hendel | |

OTHER PUBLICATIONS

Edvardsson, Bo, Bo Enquist, and Robert Johnston. "Cocreating customer value through hyperreality in the prepurchase service experience." Journal of service research 8.2 (2005): 149-161. (Year: 2005).*

Zolfo, "CXN Presentation HD" [Video], Vimeo, Dec. 2, 2019, https:vimeo.com/379038277.

International Search Report and Written Opinion, PCT/US2021/014480, dated Apr. 9, 2021.

* cited by examiner

FIG. 18

INTERACTIVE REMOTE SELECTION AND ORDERING OF WHOLESALE FASHION ITEMS

CROSS REFERENCE TO RELATED APPLICATIONS

This application claims priority under 35 U.S.C. 119(e) to U.S. Provisional Application Ser. No. 62/964,246, entitled "Interactive Remote Selection and Ordering of Wholesale Fashion Items," by Jutta S. Kurz, et al., filed on Jan. 22, 2020, the contents of both of which are herein incorporated by reference.

BACKGROUND

Field

The described embodiments relate to user-interface and augmented-reality techniques. Notably, the described embodiments relate to a virtual environment that simulates the physical experience of reviewing and selecting fashion items while a wholesale buyer is at a remote location.

Related Art

Decision making in the fashion industry is often relationship-based. For example, today wholesale buyers travel around the world to visit designer showrooms and tradeshows. A wholesale buyer for a store or a retail establishment may review the available garments, merchandise, products or articles of clothing (which are henceforth referred to as 'fashion items') at a particular showroom or tradeshow. Then, the wholesale buyer may select a subset of the fashion items that are of interest, such as fashion items that provide an interesting outfit or look, and which may offer a competitive advantage for their store or retail establishment. For convenience, the wholesale buyer may place the selected fashion items on a 'clothes rack,' such a stand fitted with pegs, hooks, or hangers, or a horizontal bar, which is used for temporary storage of these fashion items.

After this initial selection process, the wholesale buyer may review the selected fashion items in order to make any necessary changes to the selections. Then, the wholesale buyer may finalize their order from a vendor.

However, this approach for selecting and ordering fashion items is usually time-consuming and expensive. Notably, wholesale buyers need to travel to the vendor showrooms and tradeshows. Moreover, given the constraints on a wholesale buyer's time and the available travel budget, this inefficiency usually constrains the vendors that are considered. Consequently, a wholesale buyer may not consider many vendors and, thus, may miss up-and-coming vendors. Therefore, there is often an opportunity cost associated with the existing approach to selecting and ordering fashion items.

SUMMARY

A computer that provides a virtual showroom is described. This computer may include: an interface circuit that communicates with an electronic device; a computation device (such as a processor) that executes program instructions; and memory that stores the program instructions. During operation, the computer receives, via the interface circuit, information corresponding to first user-interface activity associated with the electronic device, where the user-interface activity indicates selections of a wholesale buyer of fashion items in a first user interface. Then, the computer generates instructions for a second user interface based at least in part on the first user-interface activity, where the second user interface corresponds to a virtual showroom of the wholesale buyer, the second user interface includes information representing the selected fashion items and a clothes rack with available hangers, and the second user interface allows the wholesale buyer to dynamically assemble one or more groups of the selected fashion items on one or more of the available hangers. Next, the computer provides, via the interface circuit, the instructions for the second user interface addressed to the electronic device.

Note that the second user interface may simulate or mimic a real-world showroom experience of the wholesale buyer.

Moreover, the second user-interface may allow a given selected fashion item to be picked, and to drag and drop the given selected fashion item onto a first hanger in the available hangers on the clothes rack. Furthermore, the second user-interface may allow the given selected fashion item to be moved from the first hanger to a second hanger in the available hangers.

Additionally, the selected fashion items may initially be included in a holding area in the second user interface and may be grouped or arranged in the holding area based at least in part on associated delivery dates or ranges of delivery dates.

In some embodiments, the second user interface may allow a view or a perspective of a given selected fashion item to be changed.

Moreover, the second user interface may allow customization of a background in the second user interface, where the customization of the background includes acquiring, via a camera in the electronic device or a second electronic device, an image that is subsequently used as the background.

Furthermore, the second user interface may include a user-interface object that facilitates review of a purchase order. The computer may receive, via the interface circuit, second user-interface activity associated with the electronic device that indicates activation of the user-interface object. Then, the computer may generate instructions for a third user interface based at least in part on the second user-interface activity, where the third user interface summarizes the purchase order of the wholesale buyer, and the purchase order includes the fashion items in the one or more groups of the selected fashion items and purchase information about the fashion items in the one or more groups of the selected fashion items. Next, the computer may provide, via the interface circuit, the instructions for the third user interface addressed to the electronic device.

Note that the purchase information may include sizes, colors and delivery dates or ranges of delivery dates for the fashion items in the one or more groups of the selected fashion items. Moreover, the third user interface may allow the purchase information for a given fashion item in the one or more groups of the selected fashion items to be modified. Alternatively or additionally, the fashion items in the one or more groups of the selected fashion items may be arranged or grouped based at least in part on associated delivery dates or ranges of delivery dates.

In some embodiments, the third user interface includes a second user-interface object that submits the purchase order. The computer may receive, via the interface circuit, third user-interface activity associated with the electronic device that indicates activation of the second user-interface object. Then, the computer may submit, based at least in part on the third user-interface activity, the purchase order. Next, the computer may provide, via the interface circuit, an acknowledgement of the purchase order addressed to the electronic device or a second electronic device.

Moreover, the computer may recommend or select (e.g., independently of the user-interface activity) additional fashion items for inclusion in the second user interface based at least in part on a purchase history of fashion items of the wholesale buyer, attributes of the additional fashion items and a pretrained predictive model, and the second user interface may include the additional fashion items.

Another embodiment provides the electronic device.

Another embodiment provides a computer-readable storage medium for use with the computer or the electronic device. When executed by the computer, this computer-readable storage medium causes the computer or the electronic device to perform at least some of the aforementioned operations.

Another embodiment provides a method, which may be performed by the computer or the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIGS. 5-19 are drawings illustrating examples of user interfaces that are displayed on an electronic device in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
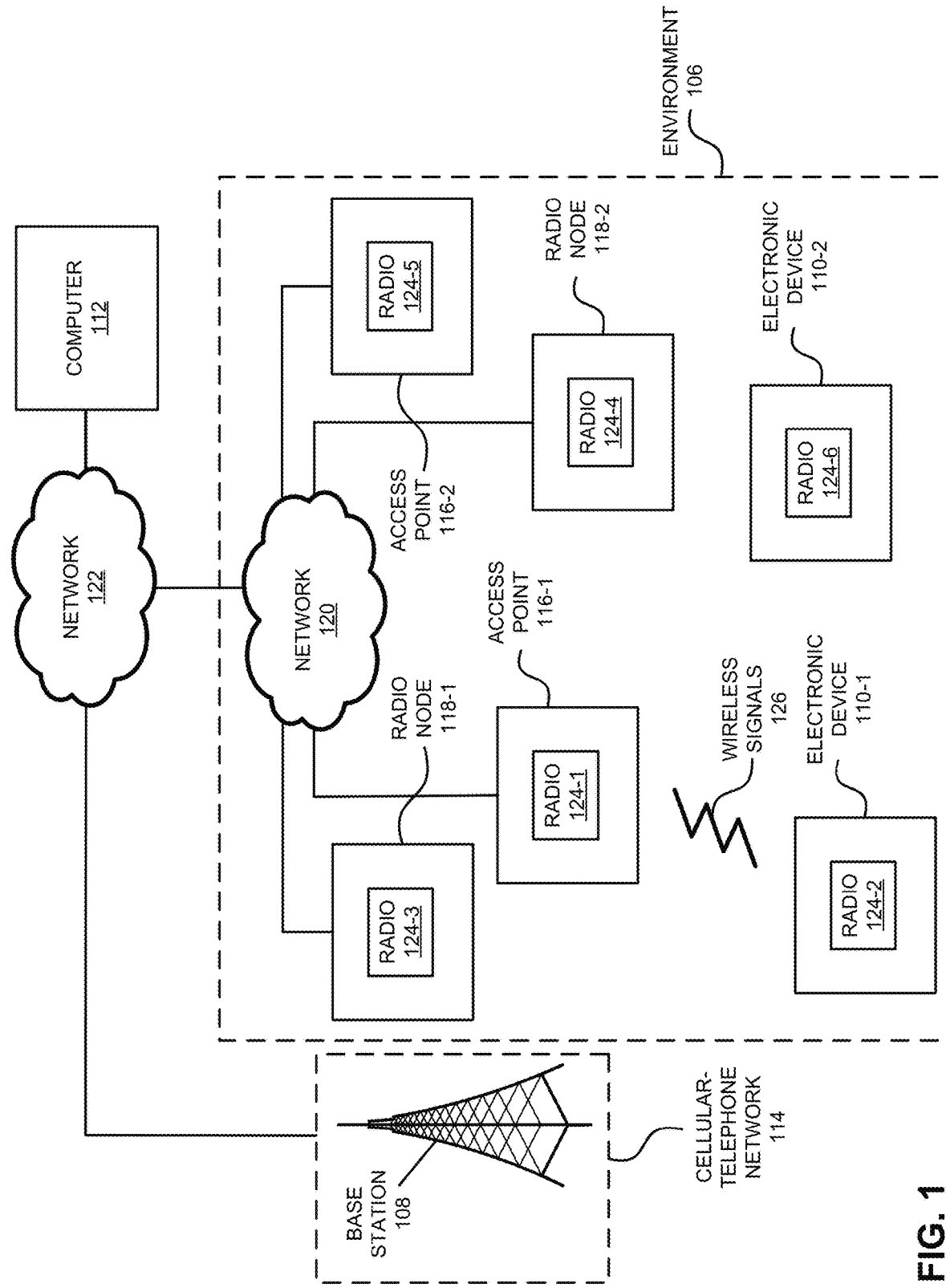
FIG. 1 is a block diagram illustrating an example of communication among electronic devices in a system in accordance with an embodiment of the present disclosure.

A computer that simulates a real-world showroom experience for a wholesale buyer is described. During operation, the computer may receive information corresponding to first user-interface activity associated with an electronic device, where the user-interface activity indicates selections of the wholesale buyer of fashion items in a first user interface. Then, the computer may generate instructions for a second user interface based at least in part on the first user-interface activity, where the second user interface corresponds to a virtual showroom of the wholesale buyer, the second user interface includes the selected fashion items and a clothes rack with available hangers, and wherein the second user interface allows the wholesale buyer to dynamically assemble one or more groups of the selected fashion items on one or more of the available hangers. Next, the computer may provide the instructions for the second user interface addressed to the electronic device.

By providing the virtual showroom, the user-interface techniques may allow the wholesale buyer to virtually select and order fashion items. These capabilities may provide improved efficiency, and with associated time and cost savings) while still allowing the wholesale buyer to be 'hands on.' Moreover, by simulating or mimicking the real-world showroom experience, the user-interface techniques may reduce or minimize the changes in wholesale buyer's behaviors during the showroom experience. Consequently, the user-interface techniques may provide numerous advantages to the vendor(s) or provider(s) of the fashion items and the wholesale buyer, while providing a showroom experience that is familiar, which may enhance the user experience and may facilitate adoption of the user-interface techniques.

We now describe some embodiments of the user-interface techniques. In the discussion that follows, Long Term Evolution or LTE (from the 3rd Generation Partnership Project of Sophia Antipolis, Valbonne, France) is used as an illustration of a data communication protocol that is used one or more radio nodes in a cellular-telephone network. The one or more radio nodes may facilitate communication in the user-interface techniques between a computer or a server and an electronic device associated with a user (such as a wholesale buyer). Consequently, the one or more radio nodes may include an Evolved Node B (eNodeB) or eNBs. In some embodiments, the communication protocol used by the one or more radio nodes may include: a third generation or 3G communication protocol, a fourth generation or 4G communication protocol, e.g., LTE, LTE Advanced or LTE-A, a fifth generation or 5G communication protocol, or other present or future developed advanced cellular communication protocol. Therefore, in other embodiments the one or more radio nodes may include: a Universal Mobile Telecommunications System (UMTS) NodeB and radio network controller (RNC), or a New Radio (NR) gNB or gNodeB (which communicate with a network with a cellular-telephone communication protocol that is other than LTE).

Alternatively or additionally, an Institute of Electrical and Electronics Engineers (IEEE) 802.11 standard (which is sometimes referred to as 'Wi-Fi,' from the Wi-Fi Alliance of Austin, Tex.) is used as an illustration of a communication protocol that is used by an access point in a wireless local area network (WLAN) to facilitate the communication between the computer or the server and the electronic device. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. However, a wide variety of communication techniques or protocols may be readily used in various embodiments. For example, an electronic device and a radio node or an access point may communicate frames or packets in accordance with a wireless communication protocol, such as: Bluetooth (from the Bluetooth Special Interest Group of Kirkland, Wash.), and/or another type of wireless interface.

Moreover, a radio node or the access point may communicate with other access points, radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a cloud-based computer or server) using a wired communication protocol (such as Ethernet) via network 120 and/or 122. Note that networks 120 and 122 may be the same or different networks. For example, networks 120 and/or 122 may an LAN, an intra-net or the Internet.

Figure 20:
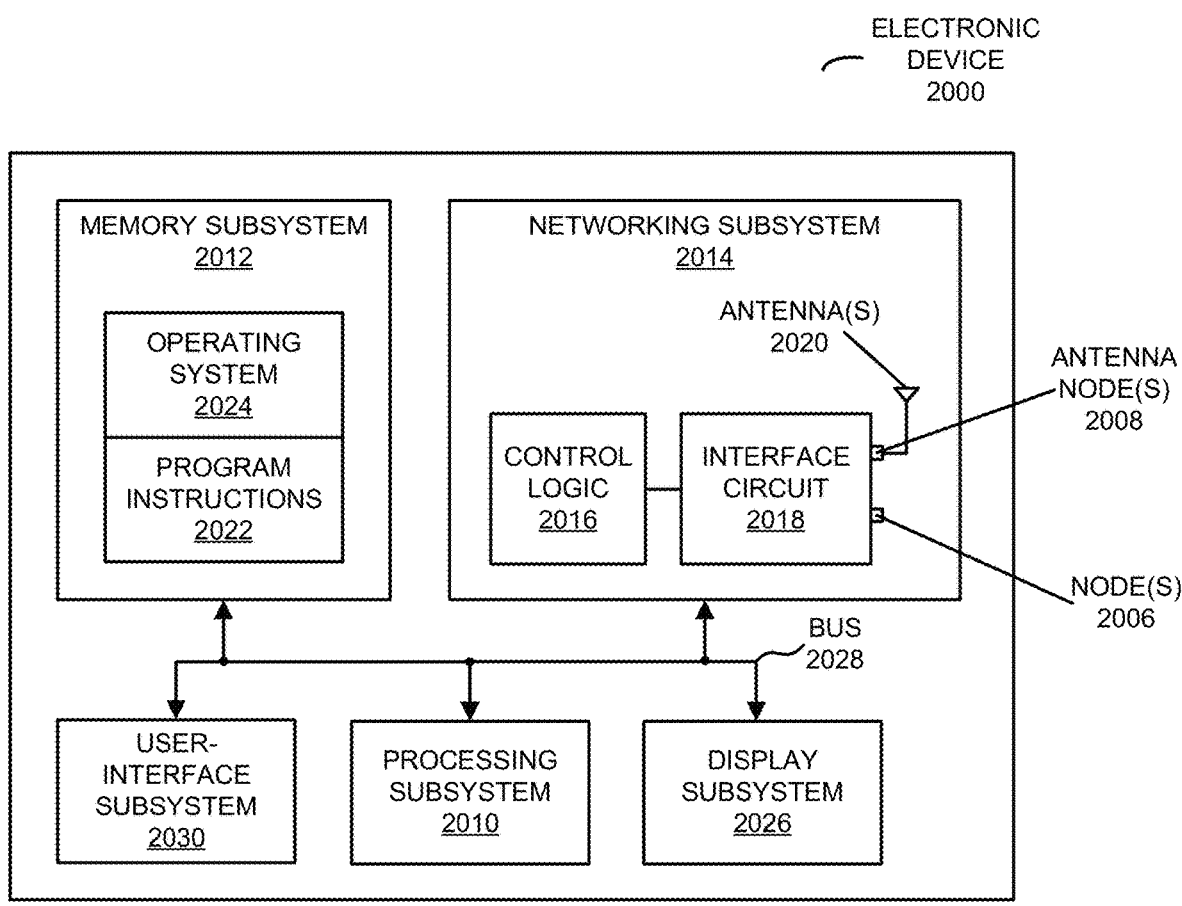
FIG. 20 is a block diagram illustrating an example of an electronic device in accordance with an embodiment of the present disclosure.

As described further below with reference to FIG. 20, electronic devices 110, computer 112, access points 116, and radio nodes 118 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, the existing approach for selecting and ordering fashion items is usually time-consuming and expensive, and often constrains the vendors that a wholesale buyer (for a physical store or retail establishment, or an online or e-commerce retailer) can consider.

As described further below with reference to FIGS. 2-19, in order to address these problems, an electronic device (such as access point 116-1 or radio node 118-1) may provide communication to one or more electronic devices (such as electronic devices 110-1). In the discussion that follows, access point 116-1 is used to illustrate the communication.

During operation, electronic device 110-1 may interact with computer 112 via access point 116-1 to display user interfaces that simulate or mimic virtual fashion show and a virtual showroom. In some embodiments, the simulated virtual fashion show and/or the virtual showroom may be realistic or may approximate a real-world equivalent fashion show or showroom. For example, the simulated virtual fashion show and/or the virtual showroom may approximate an actual or a physical fashion show and/or showroom, as well as the associated wholesale-buyer experiences in these environments.

Notably, electronic device 110-1 may receive and may display a first user interface for the virtual fashion show from computer 112. A user of electronic device 110-1, such as a wholesale buyer, may interact with the first user interface (e.g., via one or more user-interface devices in electronic device 110-1) to select at least a subset of the fashion items included in the virtual fashion show. In the present disclosure, note that a fashion item may include: an article of clothing (e.g., a shirt, pants, a jacket, a dress, a skirt, a blouse, a scarf, shoes, athletic or sports clothing, or another type of clothing) or an accessory (such as a belt, jewelry, or another type of accessory).

Then, when the user is ready, the user may indicate or specify that they are ready to start the virtual showroom experience. In response, electronic device 110-1 may interact with computer 112 via access point 116-1 to display a second user interface for the virtual showroom. The user of electronic device 110-1 may interact with the second user interface (e.g., via the one or more user-interface devices) to dynamically assemble one or more groups of the selected fashion items on one or more of available hangers in a clothes rack in the virtual showroom. More generally, the second user interface may include fixtures, holding devices, receptacles or virtual containers that can be used when dynamically assembling one or more groups of the selected fashion items. Similarly, in embodiments with other types of fashion items, the second user interface may include one or more of tables, pants hangers, etc.

Moreover, when the user is ready, the user may indicate or specify that they are ready to review their purchase order. In response, electronic device 110-1 may interact with computer 112 via access point 116-1 to display a third user interface that summarizes the purchase order. The user of electronic device 110-1 may, as needed, interact with the third user interface (e.g., via the one or more user-interface devices) to modify the purchase order (such as the colors, quantities and/or delivery dates of one or more selected fashion items in the one or more groups of selected fashion items).

Next, when the user is ready, the user may indicate or specify that they are ready to review their purchase order. In response, electronic device 110-1 may indicate to computer 112 via access point 116-1 that the user has submitted the purchase order. Based at least in part on this information, computer 112 may submit the purchase order and may provide an acknowledgment to electronic device 110-1 (or another electronic device that is associated with the user). After receiving the acknowledgment, electronic device 110-1 may display or provide the acknowledgment to the user.

In this way, the user-interface techniques may the allow the user (such as a wholesale buyer) to virtually select and order fashion items with improved efficiency, and with associated time and cost savings, while providing a familiar user experience.

While the preceding discussion illustrated the user-interface techniques with computer 112 remotely located from electronic device 110-1, in embodiments at least some of the described operation are performed locally and/or remotely. For example, computer 112 may be located locally, such as in environment 106. Moreover, in some embodiments at least some of the operations may be performed by electronic device 110-1. Notably, instead of providing the user interface, computer 112 may provide instructions that are used by electronic device 110-1 to generate the user interface or to access predetermined user interfaces that are stored in electronic device 110-1. In some embodiments, software or a standalone application that performs the user-interface techniques is installed on and executed in an environment of electronic device 110-1, such as a Web browser or an operating system. Thus, in some embodiments, all the operations may be performed by electronic device 110-1. Alternatively, in some embodiments, the user-interface techniques are implemented using a client-server architecture, such as that provided using electronic device 110-1 and computer 112.

Figure 2:
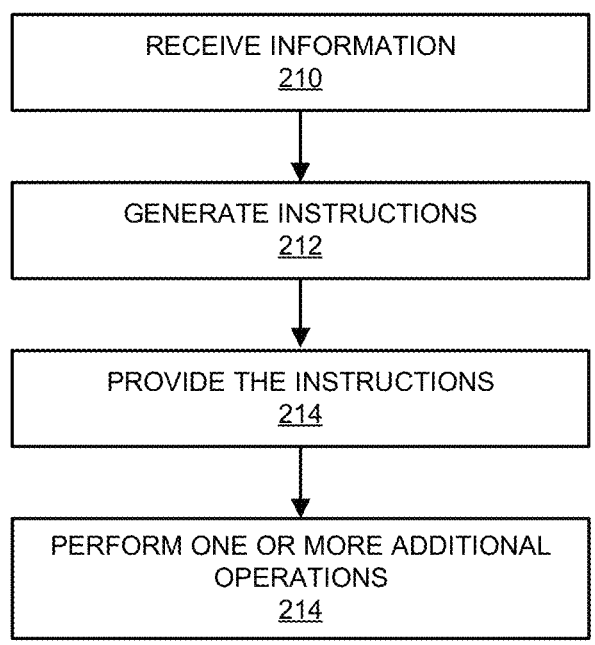
FIG. 2 is a flow diagram illustrating an example of a method for simulating a showroom experience for a wholesale buyer using a computer in FIG. 1 in accordance with an embodiment of the present disclosure.

We now describe embodiments of the method. FIG. 2 presents a flow diagram illustrating an example of a method 200 for simulating a showroom experience, which may be performed by a computer (such as computer 112 in FIG. 1). During operation, the computer may receive information (operation 210) corresponding to first user-interface activity associated with the electronic device, where the user-interface activity indicates selections of a wholesale buyer of fashion items in a first user interface.

Then, the computer may generate instructions (operation 212) for a second user interface based at least in part on the first user-interface activity, where the second user interface corresponds to a virtual showroom of the wholesale buyer, the second user interface includes information associated with the selected fashion items (such as images or representations of the selected fashion items) and a clothes rack with available hangers, and the second user interface allows the wholesale buyer to dynamically assemble one or more groups of the selected fashion items on one or more of the available hangers. Note that the second user interface may simulate or mimic a real-world showroom experience of the wholesale buyer.

Moreover, the second user-interface may allow a given selected fashion item to be picked, and to drag and drop the given selected fashion item onto a first hanger in the available hangers on the clothes rack. Furthermore, the second user-interface may allow the given selected fashion item to be moved from the first hanger to a second hanger in the available hangers. Additionally, the selected fashion items may initially be included in a holding area in the second user interface and may be grouped or arranged in the holding area based at least in part on associated delivery dates or ranges of delivery dates. In some embodiments, the second user interface may allow a view or a perspective of a given selected fashion item to be changed. Note that the second user interface may allow customization of a background in the second user interface, where the customization of the background includes acquiring, via a camera in the electronic device or a second electronic device, an image that is subsequently used as the background.

Next, the computer may provide the instructions (operation 214) for the second user interface addressed to the electronic device.

In some embodiments, the computer may optionally perform one or more additional operations (operation 216). For example, the second user interface may include a user-interface object that facilitates review of a purchase order. The computer may receive second user-interface activity associated with the electronic device that indicates activation of the user-interface object. Then, the computer may generate instructions for a third user interface based at least in part on the second user-interface activity, where the third user interface summarizes the purchase order of the wholesale buyer, and the purchase order includes the fashion items in the one or more groups of the selected fashion items and purchase information about the fashion items in the one or more groups of the selected fashion items. Next, the computer may provide the instructions for the third user interface addressed to the electronic device.

Note that the purchase information may include sizes, colors and delivery dates or ranges of delivery dates for the fashion items in the one or more groups of the selected fashion items. Moreover, the third user interface may allow the purchase information for a given fashion item in the one or more groups of the selected fashion items to be modified. Alternatively or additionally, the fashion items in the one or more groups of the selected fashion items may be arranged or grouped based at least in part on associated delivery dates or ranges of delivery dates.

In some embodiments, the third user interface includes a second user-interface object that submits the purchase order. The computer may receive third user-interface activity associated with the electronic device that indicates activation of the second user-interface object. Then, the computer may submit, based at least in part on the third user-interface activity, the purchase order. Next, the computer may provide an acknowledgement of the purchase order (such as an email or a text acknowledgment, which may include a receipt for the purchase order) addressed to the electronic device or a second electronic device.

Moreover, the computer may recommend or select (e.g., independently of the user-interface activity or based at least in part on the user-interface activity, so that there is no overlap with the selected fashion items) additional fashion items for inclusion in the second user interface based at least in part on a purchase history of fashion items of the wholesale buyer, attributes of the additional fashion items and a pretrained predictive model, and the second user interface may include the additional fashion items. For example, the attributes may include: colors, sizes, delivery dates or ranges of delivery dates, types of fashion items, etc.

Figure 3:
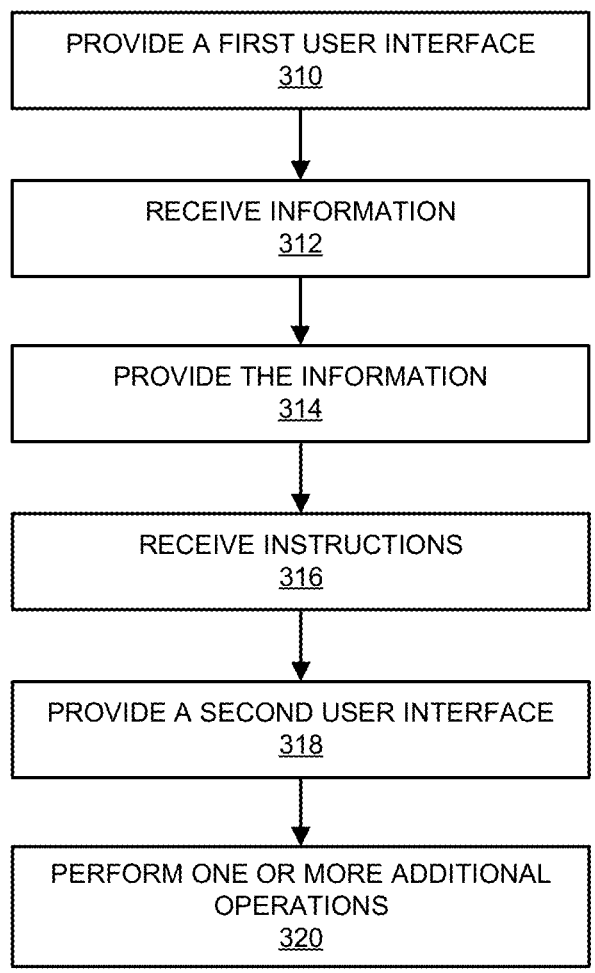
FIG. 3 is a flow diagram illustrating an example of a method for providing a simulated showroom experience using an electronic device in FIG. 1 in accordance with an embodiment of the present disclosure.

FIG. 3 presents a flow diagram illustrating an example of a method 300 for providing a simulated showroom experience, which may be performed by an electronic device (such as electronic device 110-1 in FIG. 1). During operation, the electronic device may provide, on a display (such as a display in or associated with the electronic device or an independent display), a first user interface (operation 310), where the first user interface includes information associated with a virtual fashion show that includes fashion items. For example, the virtual fashion show may include a video about the fashion items. Note that the first user interface may have been previously received from the computer.

Then, the electronic device may receive information (operation 312) specifying first user-interface activity that indicates selections of a wholesale buyer of at least a subset of the fashion items in a first user interface. In response, the electronic device may provide the information (operation 314) that specifies the first user-interface activity addressed to the computer.

Moreover, the electronic device may receive instructions (operation 316) for a second user interface associated with the computer, where the second user interface is based at least in part on the first user-interface activity, the second user interface corresponds to a virtual showroom of the wholesale buyer, the second user interface includes information associated with the selected fashion items (such as images or representations of the selected fashion items) and a clothes rack with available hangers, and the second user interface allows the wholesale buyer to dynamically assemble one or more groups of the selected fashion items on one or more of the available hangers.

Next, the electronic device may provide, on the display, the second user interface (operation 318) for the second user interface.

In some embodiments, the electronic device may optionally perform one or more additional operations (operation 320). For example, the second user interface may include a user-interface object that facilitates review of a purchase order. The electronic device may receive information specifying second user-interface activity that indicates activation of the user-interface object, and may provide the information specifying the second user-interface activity addressed to the computer. Then, the electronic device may receive instructions for a third user interface associated with the computer, where the third user interface is based at least in part on the second user-interface activity, the third user interface summarizes the purchase order of the wholesale buyer, and the purchase order includes the fashion items in the one or more groups of the selected fashion items and purchase information about the fashion items in the one or more groups of the selected fashion items. Next, the electronic device may provide, on the display, the third user interface Moreover, the third user interface may include a second user-interface object that submits the purchase order. The electronic device may receive information specifying third user-interface activity that indicates activation of the second user-interface object, and may provide the information specifying the third user-interface activity addressed to the computer. Then, the electronic device may receive an acknowledgement of the purchase order associated with the computer, and may provide, to the display, the acknowledgment.

In some embodiments of methods 200 (FIG. 2) and/or 300, there may be additional or fewer operations. Furthermore, the order of the operations may be changed, and/or two or more operations may be combined into a single operation.

Figure 4:
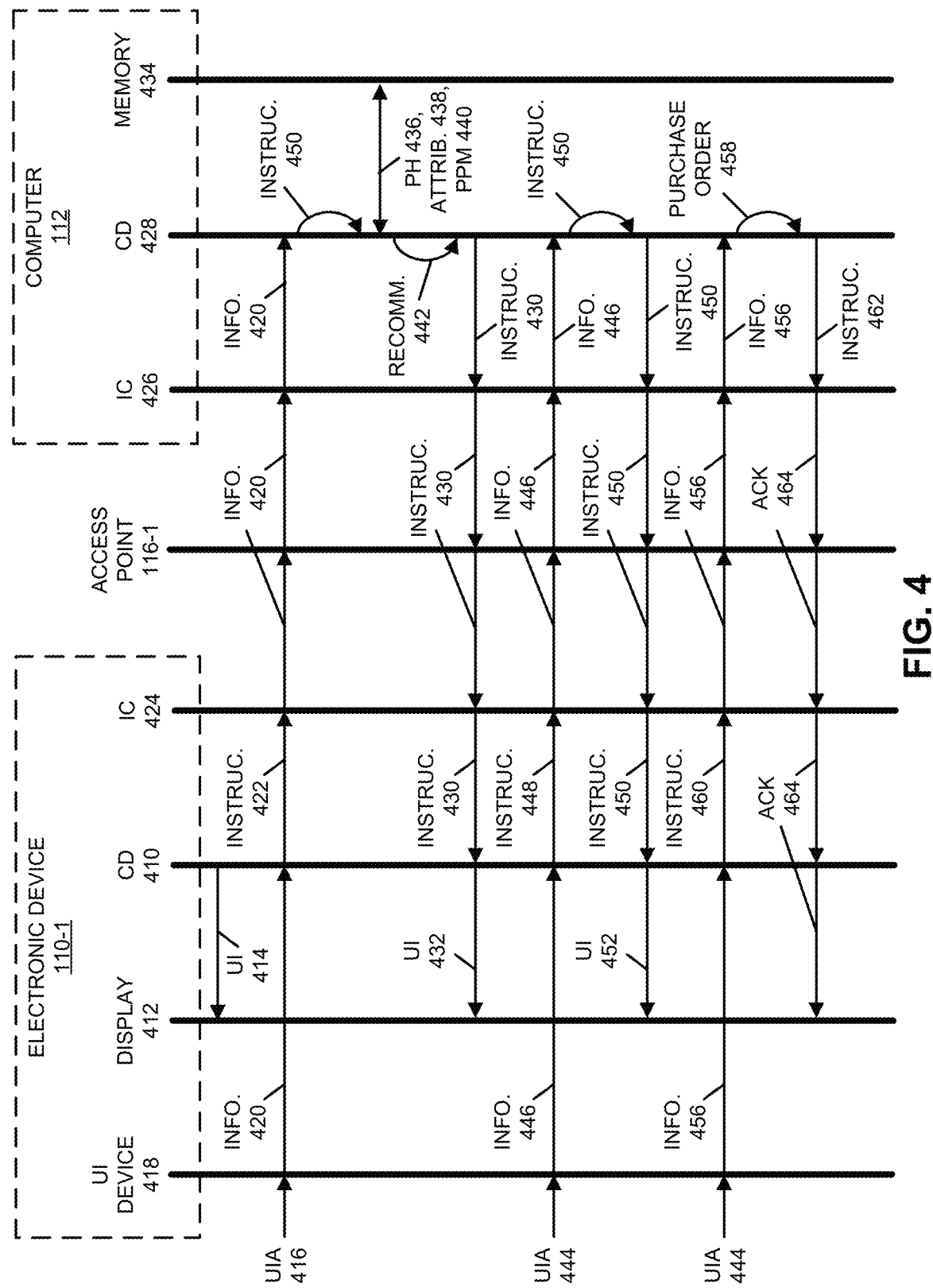
FIG. 4 is a drawing illustrating an example of communication between the computer and an electronic device in FIG. 1 in accordance with an embodiment of the present disclosure.

Embodiments of the user-interface techniques are further illustrated in FIG. 4, which presents a drawing illustrating an example of communication among computer 112, access point 116-1 and electronic device 110-1. In FIG. 4, a computational device (CD) 410 (such as a processor) in electronic device 110-1 may provide, on a display 412 in electronic device 110-1, a first user interface (UI) 414, where the first user interface includes 414 information associated with a virtual fashion show that includes fashion items. Based at least in part on first user-interface activity (UTA) 416 that indicates selections of a wholesale buyer of at least a subset of the fashion items in the first user interface 414, a user-interface device 418 in electronic device may provide, to computation device 410, information 420 specifying the first user-interface activity 416 that indicates selections of a wholesale buyer of at least a subset of the fashion items in the first user interface 414. In response, computation device 410 may instruct 422 an interface circuit (IC) 424 in electronic device 110-1 to provide information 420 (e.g., in one or more packets or frames) to computer 112 via access point 116-1.

After receiving information 420, an interface circuit 426 in electronic device 110-1 may provide information 420 to a computation device 428 (such as a processor) in electronic device 110-1. Then, computation device 428 may generate instructions 430 for a second user interface 432 based at least in part on the first user-interface activity 416, where the second user interface 432 corresponds to a virtual showroom of the wholesale buyer, the second user interface includes information associated with the selected fashion items (such as images or representations of the selected fashion items) and a clothes rack with available hangers, and the second user interface 432 allows the wholesale buyer to dynamically assemble one or more groups of the selected fashion items on one or more of the available hangers.

Alternatively or additionally, computation device 428 may access, in memory 434 in computer 112, a purchase history (PH) 436 of fashion items of the wholesale buyer, attributes 438 of additional fashion items and a pretrained predictive model (PPM) 440. Then, computation device 428 may recommend 442 or select additional fashion items for inclusion in the second user interface 432 based at least in part on a purchase history 436 of fashion items of the wholesale buyer, attributes 438 of the additional fashion items and the pretrained predictive model 440.

Next, computation device 428 may provide instructions 430 (e.g., in one or more packets or frames) to interface circuit 426, which may provide instructions 430 to electronic device 110-1 via access point 116-1. After receiving instructions 430, interface circuit 424 may provide instructions 430 to computational device 410, which displays the second user interface 432 on display 412. While not shown in FIG. 4, the wholesale buyer may interact with the second user interface 432 via user-interface device 418 to dynamically assemble one or more groups of the selected fashion items on one or more of the available hangers.

Subsequently, based at least in part on second user-interface activity 444 that indicates activation of a user-interface object in the second user interface 432, user-interface device 418 may provide, to computation device 410, information 446 specifying the second user-interface activity 444. Note that information 444 may also specify the one or more groups of the selected fashion items. In response, computation device 410 may instruct 448 interface circuit 424 to provide information 446 (e.g., in one or more packets or frames) to computer 112 via access point 116-1.

After receiving information 446, interface circuit 426 may provide information 446 to computation device 428. Then, computation device 428 may generate instructions 450 for a third user interface 452 based at least in part on the second user-interface activity 444 that summarizes a purchase order of the wholesale buyer. Next, computation device 428 may provide instructions 450 to interface circuit 426, which may provide instructions 450 (e.g., in one or more packets or frames) to electronic device 110-1 via access point 116-1. After receiving instructions 450, interface circuit 424 may provide instructions 450 (e.g., in one or more packets or frames) to computational device 410, which displays the third user interface 452 on display 412.

Moreover, based at least in part on third user-interface activity 454 that indicates activation of a second user-interface object in the third user interface 452, user-interface device 418 may provide, to computation device 410, information 456 specifying the third user-interface activity 454 that indicates submission of a purchase order 458. In response, computation device 410 may instruct 460 interface circuit 424 to provide information 456 (e.g., in one or more packets or frames) to computer 112 via access point 116-1.

After receiving information 456, interface circuit 426 may provide information 456 to computation device 428. In response, computation device 428 may submit purchase order 458 (which may involve additional operations that are not shown in FIG. 4). Next, computation device 428 may provide an instruction 462 to interface circuit 426, which may provide an acknowledgment (ACK) 464 for purchase order 458 to electronic device 110-1 via access point 116-1. After receiving acknowledgment 464, interface circuit 424 may provide acknowledgment 464 to computational device 410, which displays acknowledgment 464 on display 412.

While FIG. 4 illustrates communication between components using unidirectional or bidirectional communication with lines having single arrows or double arrows, in general the communication in a given operation in this figure may involve unidirectional or bidirectional communication.

We now describe embodiments of the user interfaces in the virtual showroom (which is sometimes referred to as a 'virtual wholesale-buyer environment') that may be displayed on a display of electronic device 110-1. Notably, during operation electronic device 110-1 may execute an application that presents or displays user interfaces that are provided by computer 112. Note that the application may be installed or resident on electronic device 110-1, or a portion of another application that is resident on and which executes on electronic device 110-1 (such as an application that is provided by computer 212 or by a application marketplace provided by a third party). However, in other embodiments, the user may interact with a web page that is provided by computer 112, which is rendered by a web browser on electronic device 110-1. For example, at least a portion of the application may be an application tool that is embedded in the web page, and which executes in a virtual environment of the web browser. Thus, the application tool may be provided to electronic device 110-1 via a client-server architecture.

Figure 5:
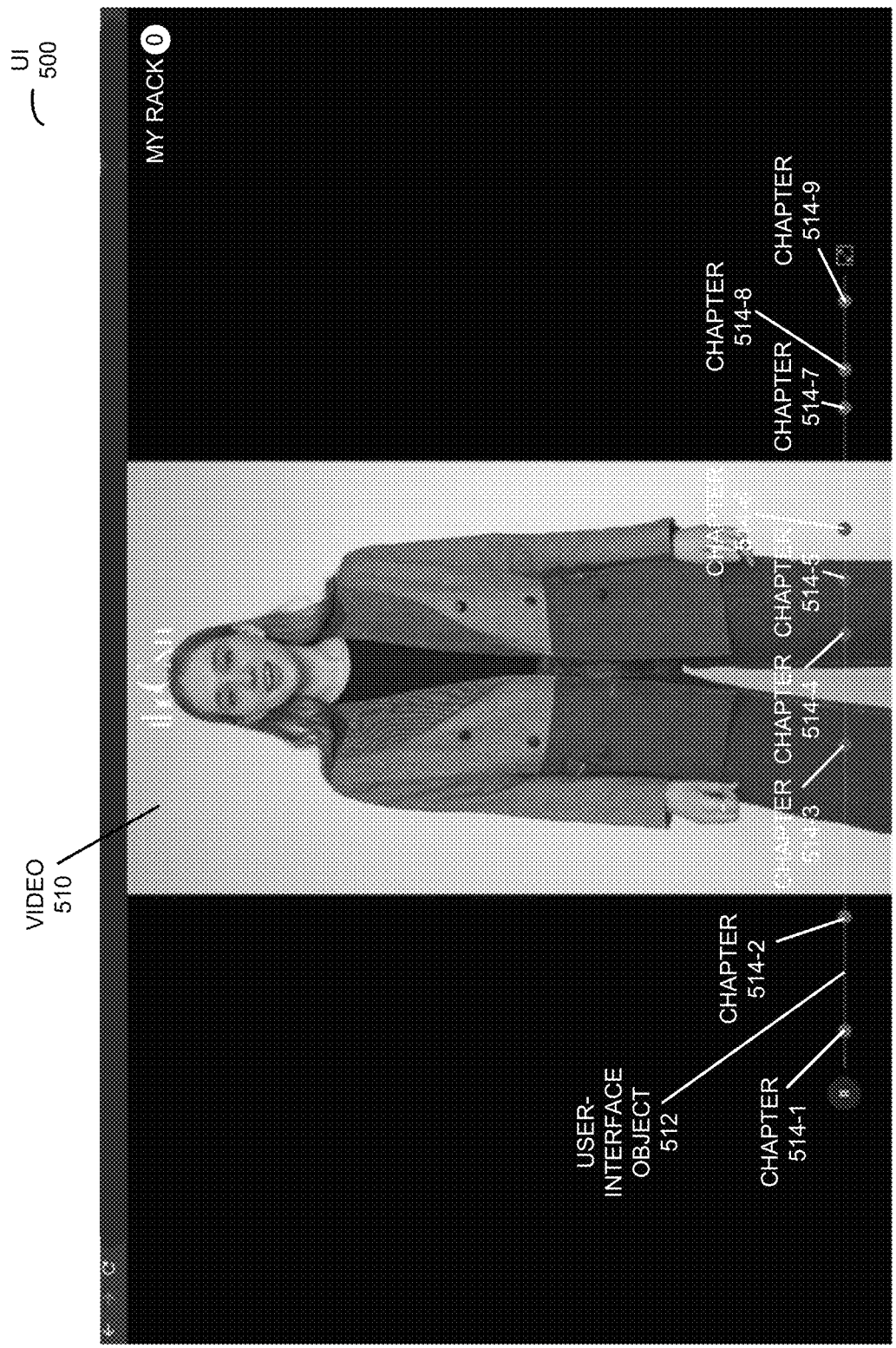

As shown in FIG. 5, which presents an example of user interface 500, during execution of the application electronic device 110-1 may provide or display user interface 500 with an interactive product list page. The product list page may include or present a video 510 of or about different fashion items.

Moreover, user interface 500 may include a user-interface object 512 (or graphical control element) of a timeline with selectable chapters 514 in video 510, which correspond to different timestamps in video 510. In response to user-interface activity of a user, e.g., a wholesale buyer (such as activation of a physical button or icon, activation of a virtual icon in a touch-sensitive display, movement of a physical or a virtual slider, or a voice command that indicates selection of a given chapter 512-1 in user-interface object 512), video 510 may jump to the specified timestamp associated with the given chapter 514-1. Thus, user-interface object 512 may encourage and facilitate rapid (and possibly discontinuous) navigation within video 510. Note that when a wholesale buyer hovers over the given chapter 514-1 (e.g., by making and maintaining contact with a touch-sensitive display directly over or proximate to the given chapter 514-1), user interface 500 may present a thumbnail view (not shown) of the given chapter 514-1 adjacent to the given chapter 514-1 in user-interface object 512. In some embodiments, the thumbnail may include a static view of a grid cell associated with the given chapter 514-1.

Figure 6:
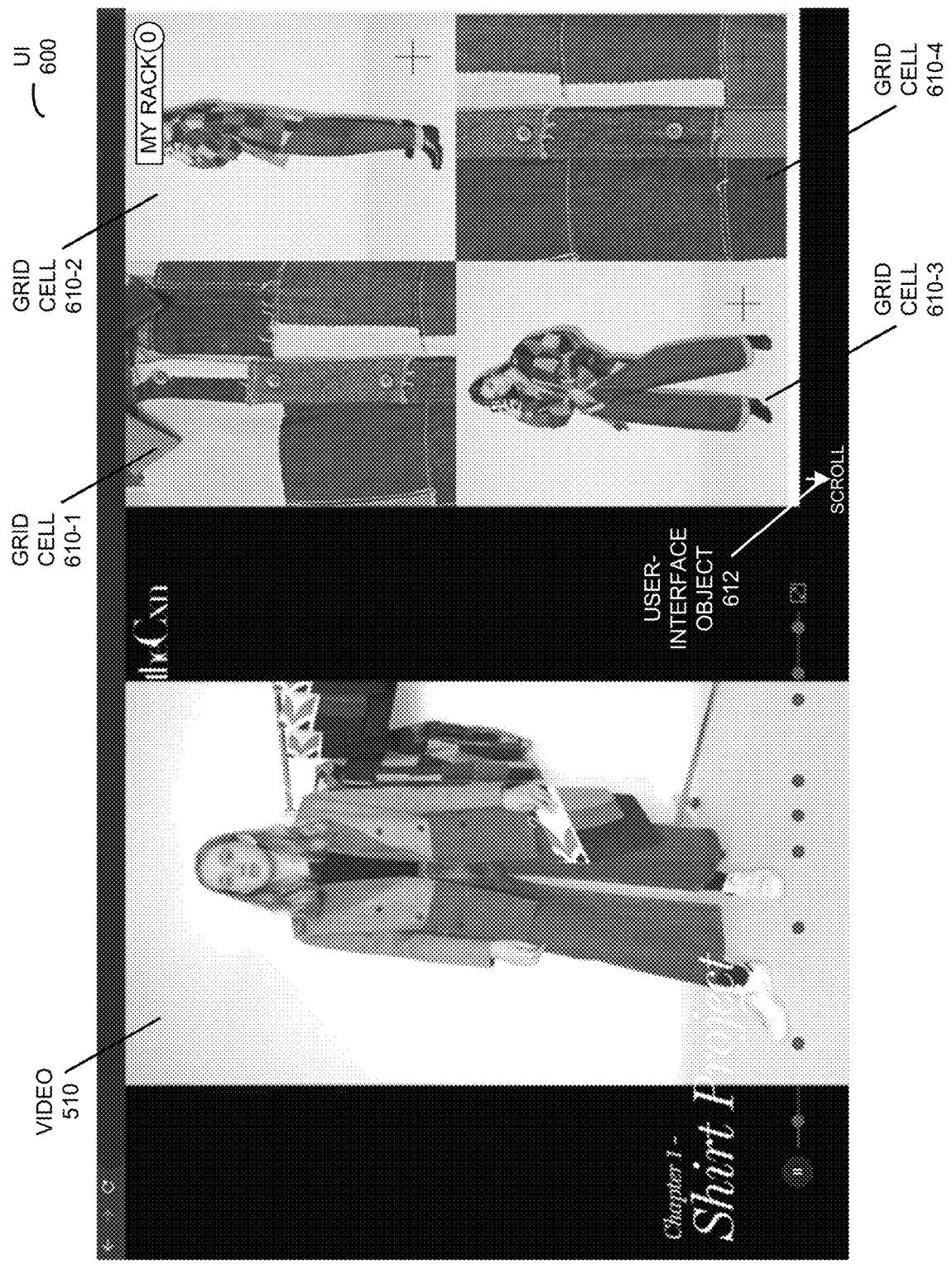

Furthermore, as shown in FIG. 6, which presents an example of user interface 600, when the user activates or selects the given chapter 514-1 (as opposed to hovering over the given chapter 514-1), e.g., by making and breaking contact with a touch-sensitive display within a strike or contact area associated with the given chapter 514-1, user interface 600 may be displayed. User interface 600 may include multiple grid cells 610 adjacent to the video. For example, grid cells 610 may be arranged in a column format, such as a 2×2 array. A given grid cell 610-1 may present or display a look or a view (e.g., a perspective) of at least a given fashion item that is included in video 510. Grid cells 610 may provide a close-up or a higher-magnification view of the fashion items than in video 510. In some embodiments, a wholesale buyer may use user-interface commands or icons to dynamically adjust the magnification of a given fashion item in the given grid cell 610-1. Note that the content in the given grid cell 610-1 may be static (such as a picture or an image) or dynamic (such as a video of a professional model or an avatar that represents the professional model).

In some embodiments, user interface 600 may include a second user-interface object 612 (such as a 'scroll' icon, which may include a visual indication or a clue as to the associated function of the scroll icon, e.g., a down-pointing arrow) that allows user interface 600 to be scrolled down to present additional grid cells. For example, in response to second user-interface activity of the wholesale buyer (such as activation of the second user-interface object 612, e.g., using a physical icon or button, or a virtual icon in a touch-sensitive display), user interface 600 may scroll down so that video 510 and at least one or more addition grid cells are presented.

Figure 7:

Additionally, as shown in FIG. 7, which presents an example of user interface 700, in response to third user-interface activity of the wholesale buyer (such as selection of the given grid cell 610-1 by activation of a physical button or icon, activation of a virtual icon in a touch-sensitive display, or a voice command that indicates the selection), user interface 700 may be displayed. User interface 700 may present video 510 and the selected given grid cell 610-1 adjacent to video 510 (and, thus, the other grid cells 610 shown in FIG. 6 may not be presented). Moreover, user interface 700 may include information about the given fashion item, such as: a product name, a wholesale price, a retail price, and/or a current color of the given fashion item in the given cell 610-1. More generally, the information may include details about the given fashion item.

Note that in embodiments where the given grid cell 610-1 includes multiple fashion items, user interface 700 may include a set of selectable user-interface objects (not shown) and associated images of the different fashion items (such as images of a shirt and one or more pairs of jeans). By selecting a given one of the set of user-interface objects, a wholesale buyer may change the given fashion item presented in the given grid cell 610-1. Moreover, a current selected fashion item in the set of user-interface objects may be highlighted.

Figure 8:

In some embodiments, user interface 700 may include a third user-interface object 710 (such as a drop-down list, radio buttons or checkboxes) that allows a size of the given fashion item (such as extra-small or XS, small or S, medium or M, large or L, or extra-large or L) to be selected. For example, as shown in FIG. 8, which presents an example of user interface 800, in response to fourth user-interface activity of the wholesale buyer that specifies selection of one of the available sizes in the third user-interface object 710, the presented size in user interface 800 may be accordingly changed to show different available sizes for a particular fashion item. Similarly, in some embodiments, user interface 700 (FIG. 7) may include another user-interface object (not shown) that allows a color of the given fashion item to be selected or changed.

As shown in FIG. 7, user interface 700 may include a fourth user-interface object 712 associated with a given fashion item (such as an 'add to rack' icon). When fifth user-interface activity of the wholesale buyer indicates activation or selection of the fourth user-interface object 712, the given fashion item (with the associated current size and/or color) may be added to a selected list of fashion items.

Figure 9:

Moreover, FIG. 9, which presents an example of user interface 900, after activation of the fourth user-interface object 712 (FIG. 7), user interface 900 may include a fifth user-interface object 910 associated with a so-called 'rack view' (such as a 'my rack' icon, which may provide a visual indication, e.g., a number, of the number of fashion items in the selected list of fashion items). When sixth user-interface activity of the wholesale buyer indicates activation or selection of the fifth user-interface object 910, a different user interface with the rack view may be presented. This is shown in FIG. 10, which presents an example of a rack-view user interface 1000.

The rack-view user interface 1000 allows the wholesale buyer to visually put together or assemble groups of fashion items that may constitute an outfit. The rack-view user interface 1000 may virtually mimic or simulate a real-world showroom experience for the wholesale buyer. Notably, the rack-view user interface 1000 may allow the wholesale buyer to create a story for store or a retail establishment, including the fashion items, the color, the sizes, the fabric, the delivery schedule, etc. However, because the rack-view user interface 1000 can be remotely accessed by the wholesale buyer, the user-interface techniques may address the problems associated with existing approach for selecting and ordering fashion items (including providing improved efficiency, with associated time and cost savings) while still allowing the wholesale buyer to be 'hands on' in a virtual selection and ordering process. Moreover, the rack-view user interface 1000 may facilitate interaction between the wholesale buyer and the vendor(s), so that relationships between these individuals can be nurtured and enhanced.

Figure 10:
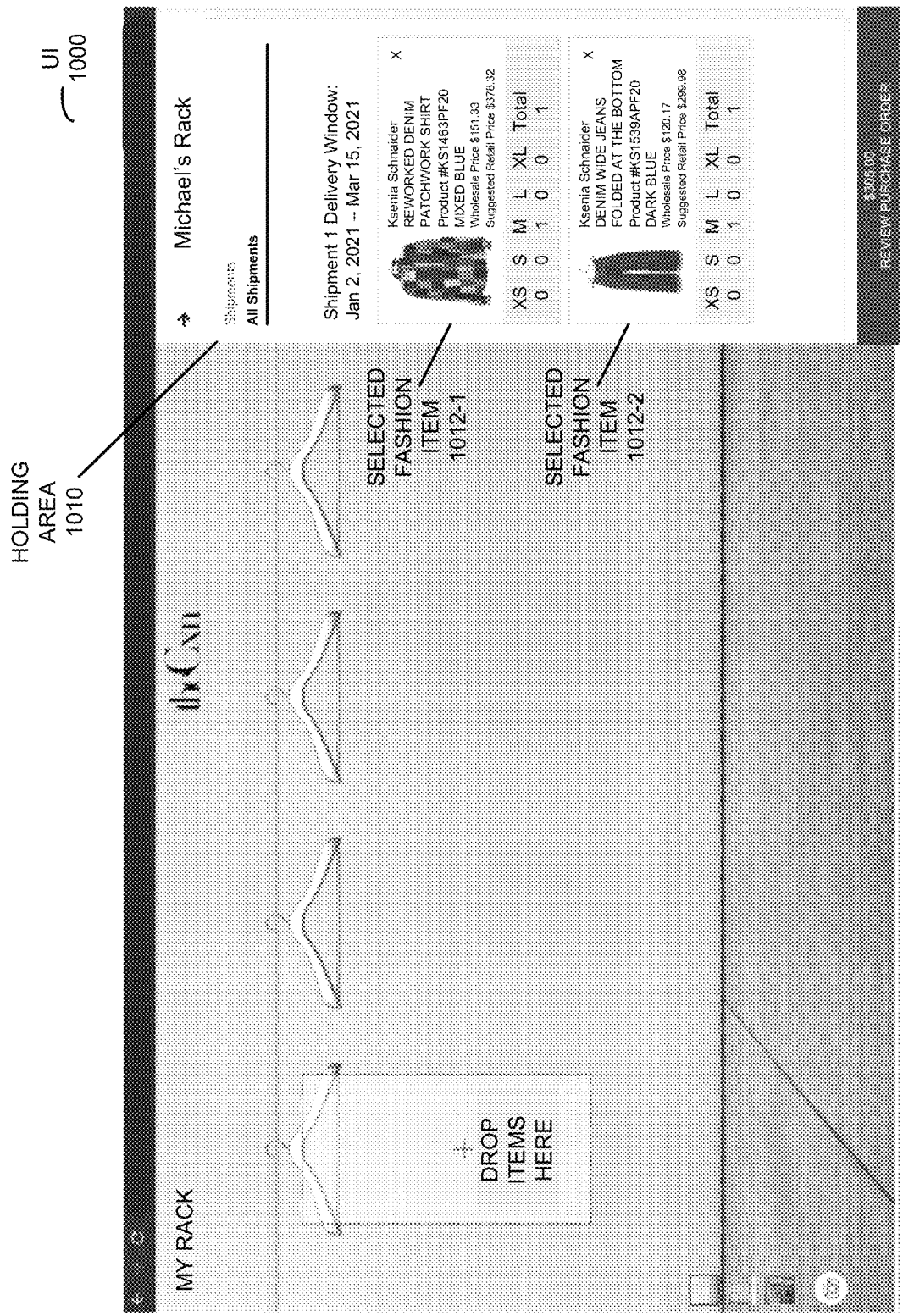
Figure 11:
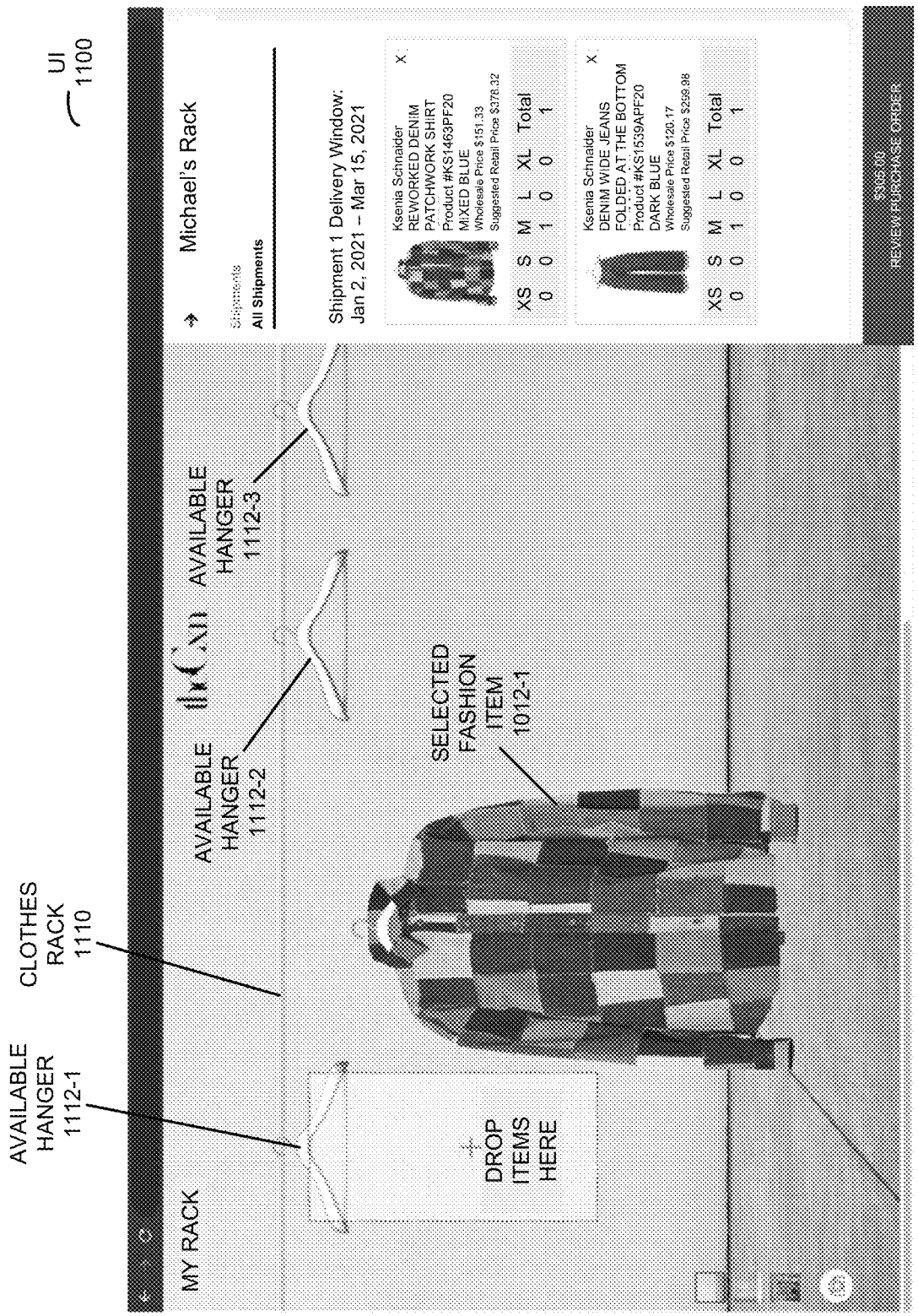
Figure 12:
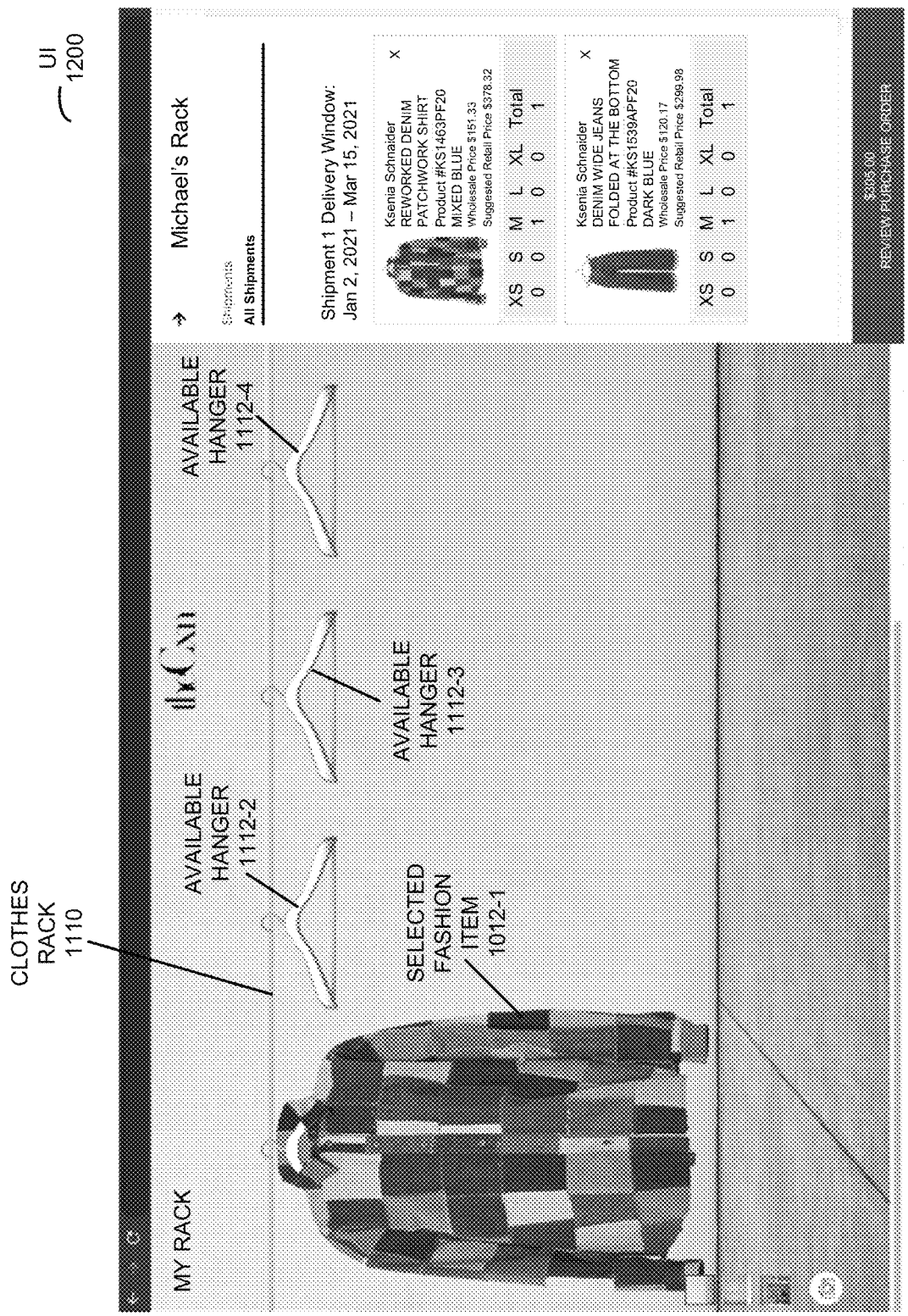

As shown in FIG. 10, the rack-view user interface 1000 may present previously selected fashion items 1012 on the list of fashion items in a scrollable holding area 1010, e.g., on the right-hand side. In some embodiments, the fashion items 1012 may be grouped or arranged according to their delivery dates or ranges of delivery dates. In addition, Moreover, as shown in FIGS. 11 and 12, which present examples of user interfaces 1100 and 1200, the wholesale buyer may drag and drop a given fashion item 1012-1 in the selected list of fashion items 1012 onto a clothes rack 1110 that is presented in the rack-view user interfaces 1000 (FIGS. 10), 1100 and 1200. For example, the wholesale buyer may user a human-interface device (such as a keyboard, a mouse, a track pad, a touch-sensitive display, voice recognition, etc.) to select the given fashion item 1012-1, drag it to clothes rack 1110, and then drop it there (such as onto an available or unused virtual hanger 1112-1 on clothes rack 1110, as shown in FIG. 12). In some embodiments, the wholesale buyer may make contact with a touch-sensitive display over the given fashion item 1012-1 using a finger. Then, the wholesale buyer may move or drag their finger to clothes rack 1110 while maintaining contact with the touch-sensitive display. Next, the wholesale buyer may break or release contact with the touch-sensitive display, thereby placing or dropping the given fashion item 1012-1 on clothes rack 1110, e.g., onto one of available hangers 1112.

While the preceding discussion illustrated interaction with the rack-view user interfaces 1000 (FIGS. 10), 1100 and 1200 as involving physical contact with a touch-sensitive display, in other embodiments there may not be physical contact. For example, using remote object tracking (such as ultrasound, radar, image analysis, etc.), the locations of one or more fingers of the wholesale buyer may be tracked (even when there is no physical contact with a touch-sensitive display). The wholesale buyer may use a hand or finger gesture to select the given fashion item, may move their hand to indicate dragging, and then may use another hand or finger gesture to drop the given fashion item onto clothes rack 1110. Alternatively or additionally, electronic device 110-1 may track the gaze direction of the wholesale buyer and/or the wholesale buyer may perform any of the preceding operations by providing voice commands or verbal instructions (via a voice-recognition interface).

Figure 13:
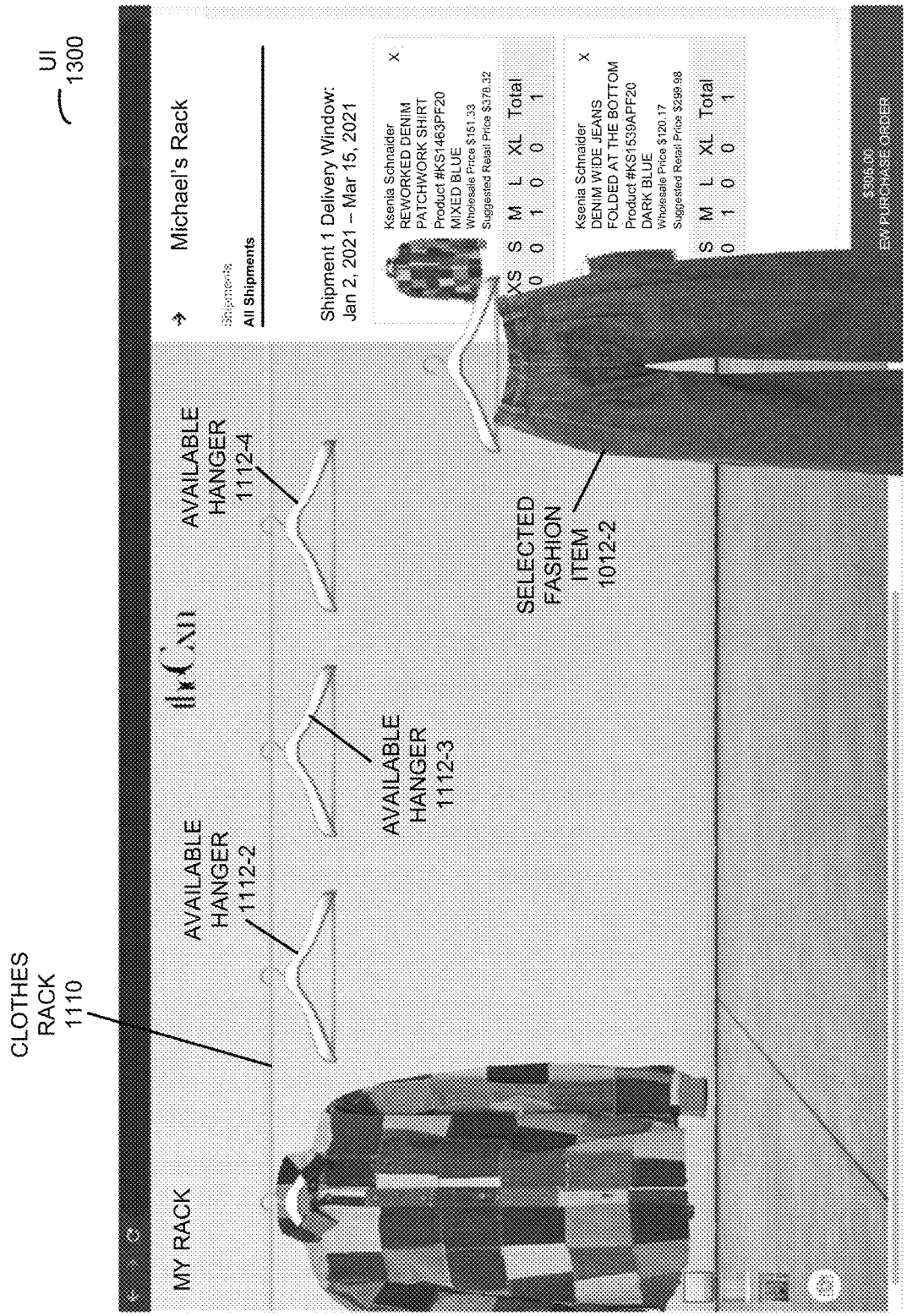
Figure 14:
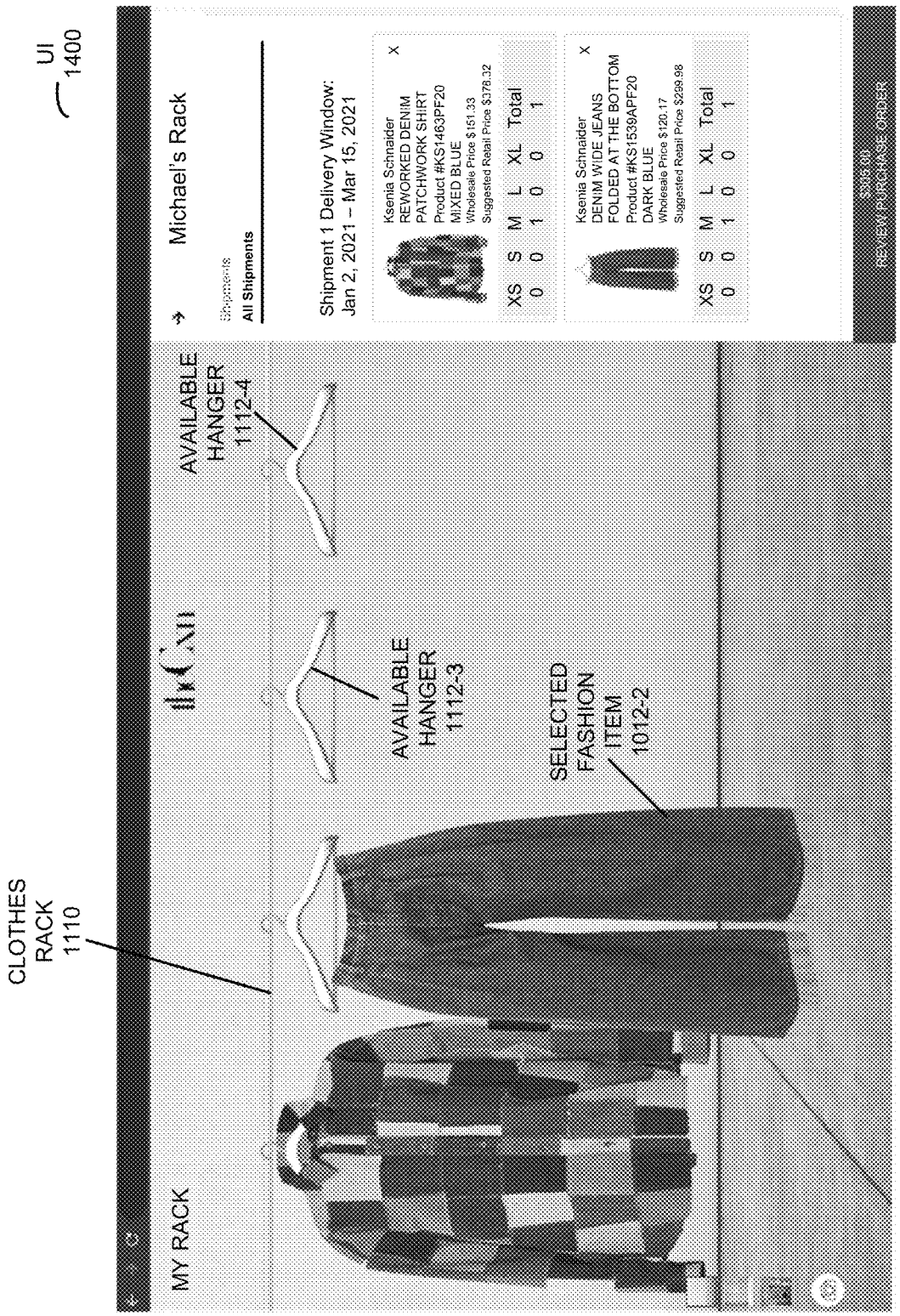

Furthermore, as shown in FIGS. 13 and 14, which presents examples of user interfaces 1300 and 1400, the wholesale buyer may add one or more additional fashion items (such as fashion item 1012-2) from the selected list of fashion items 1012 to clothes rack 1110. Additionally, as shown in FIG. 14, in some embodiments, the wholesale buyer may user a user-interface object (not shown) to rotate or change a view of a given fashion item in clothes rack 1110, such as fashion item 1012-2. Alternatively or additionally, the wholesale buyer may interact with and/or manipulate the given fashion item in clothes rack 1110 (such as by making a gesture or touching a touch-sensitive display and pitching and twisting the given fashion item, or by providing a verbal command or instructions) in order to change the view or perspective of the presented or displayed given fashion item. Similarly, by using gestures or interaction with the given fashion item, the wholesale buyer may move or reposition the given fashion item on clothes rack 1110. For example, the wholesale buyer may pickup and move the given fashion item from one virtual hanger (such as virtual hanger 1112-1) to another unused virtual hanger (such as virtual hanger 1112-3).

Figure 15:
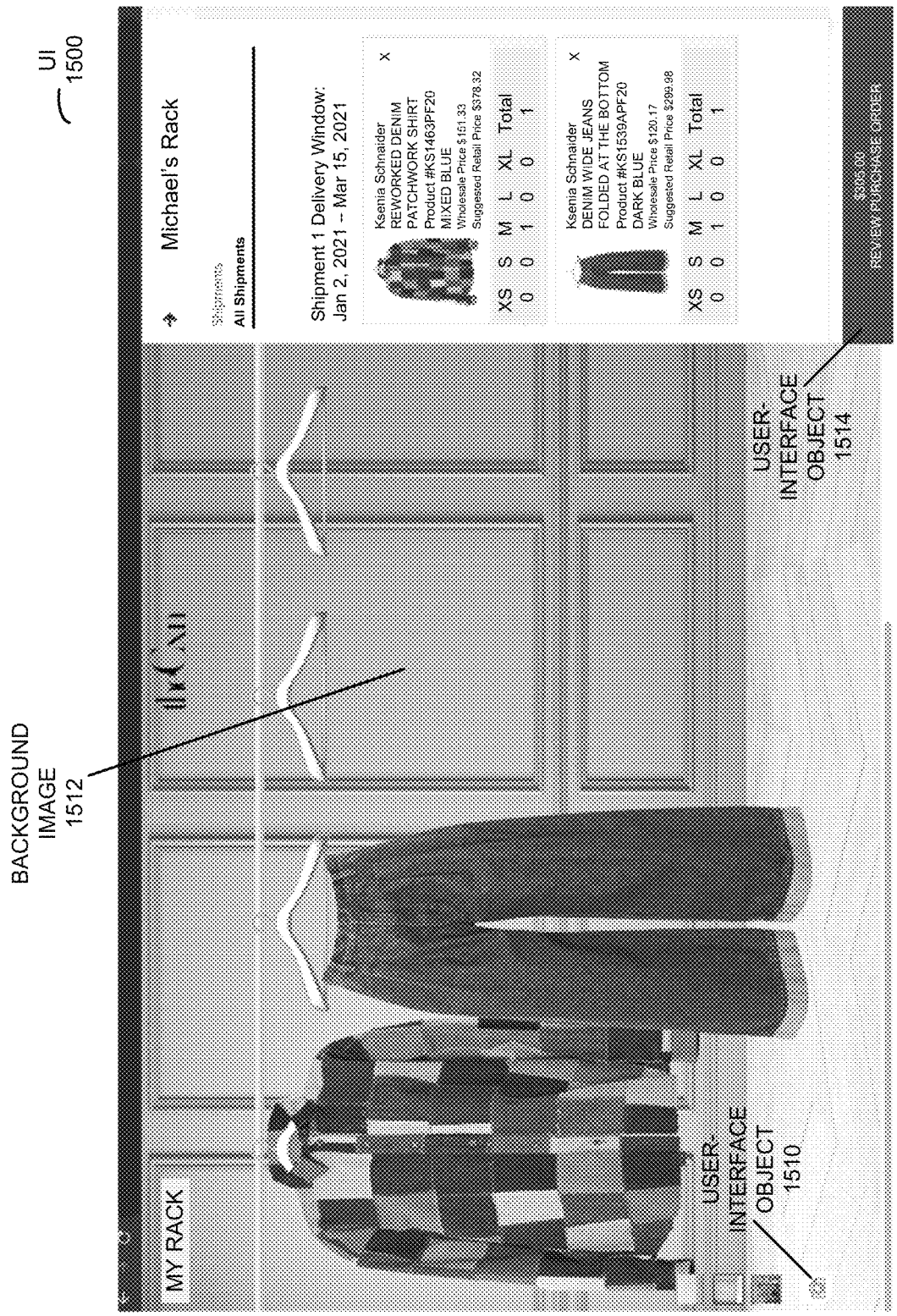

As shown in FIG. 15, which presents an example of a user interface 1500, in some embodiments the wholesale buyer may activate or select a sixth user-interface object 1510 in the rack-view user interface 1500. This may allow wholesale buyer to customize a background image 1512 in the rack-view user interface 1500, e.g., using different predefined backgrounds or by taking an image (e.g., using a camera or an image sensor in an electronic device 110-1 or in a separate electronic device, such as a cellular telephone) or a selecting a desired pre-existing background. For example, by activating the 'camera' user-interface object 1510, the wholesale buyer may use a camera in their cellular telephone to take a picture or acquire an image of a storefront or showroom.

At any time while viewing or interacting with the embodiments of the rack-view user interface, the wholesale buyer may active or select a seventh user-interface object 1514 to review the fashion items in clothes rack 1110, which have been selected for purchase. For example, the wholesale buyer may activate or select the 'review purchase order' user-interface object 1514 in the rack-view user interface 1500.

Figure 16:
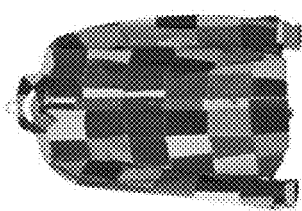

Moreover, as shown in FIG. 16, which presents an example of a user interface 1600, after the user selects the review purchase order user-interface object 1514, a checkout-view user interface 1600 may be presented. The wholesale buyer may interact with the checkout-view user interface 1600 to finalize their order. Notably, the wholesale buyer may see fashion items, sizes, colors, and delivery dates. In some embodiments, the fashion items for purchase may be arranged or order from top to bottom in the checkout-view user interface 1600 according to delivery date. The wholesale buyer may be able to scroll down in order to view all of the fashion items for purchase.

Figure 17:
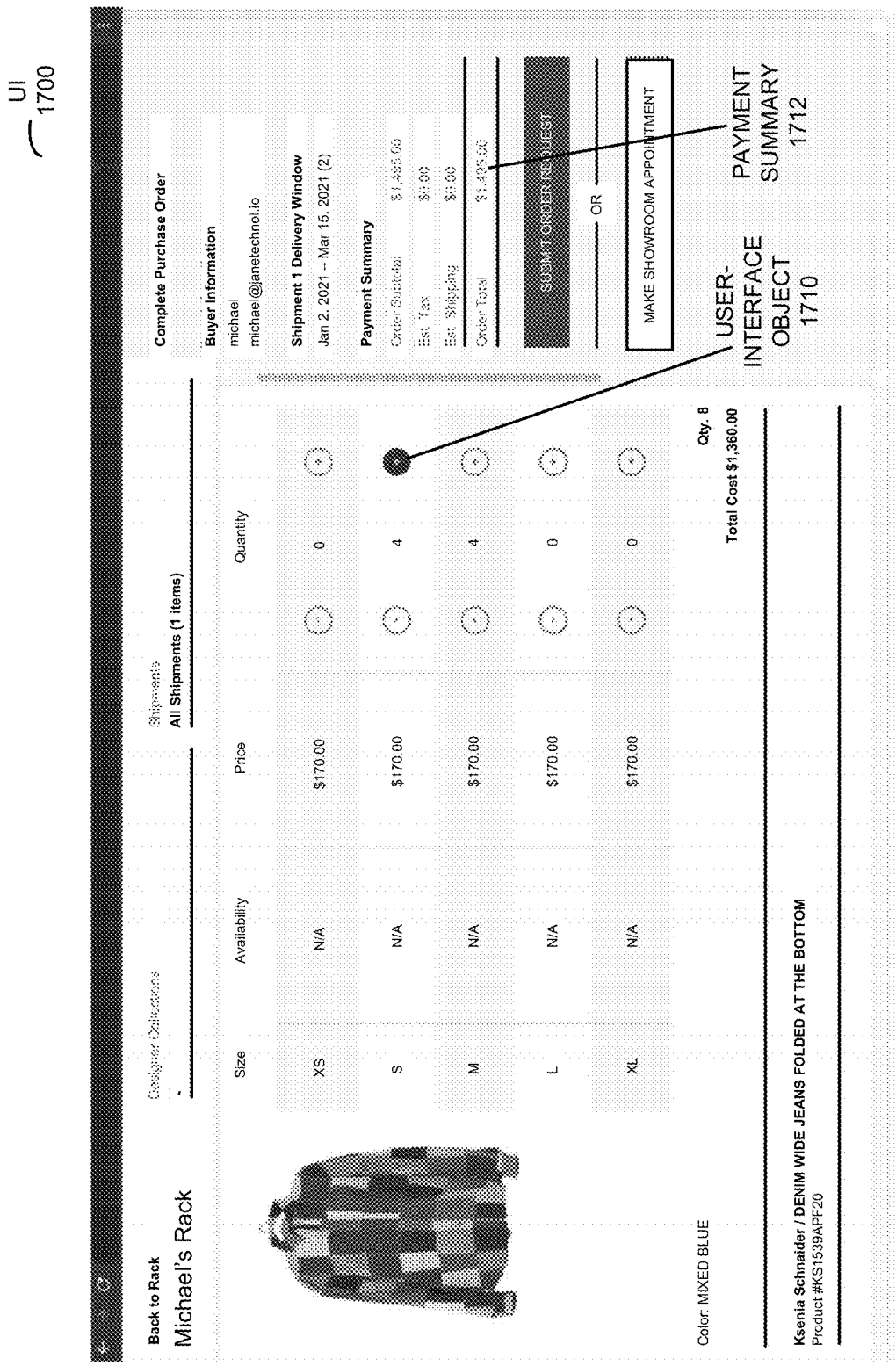

Furthermore, as shown in FIG. 17, which presents an example of a user interface 1700, the wholesale buyer may interact with one or more of the user-interface objects (such as user-interface object 1710) in the checkout-view user interface 1700 to modify or change their order. For example, the wholesale buyer may change the quantity and/or sizes of a given fashion item.

Figure 18:
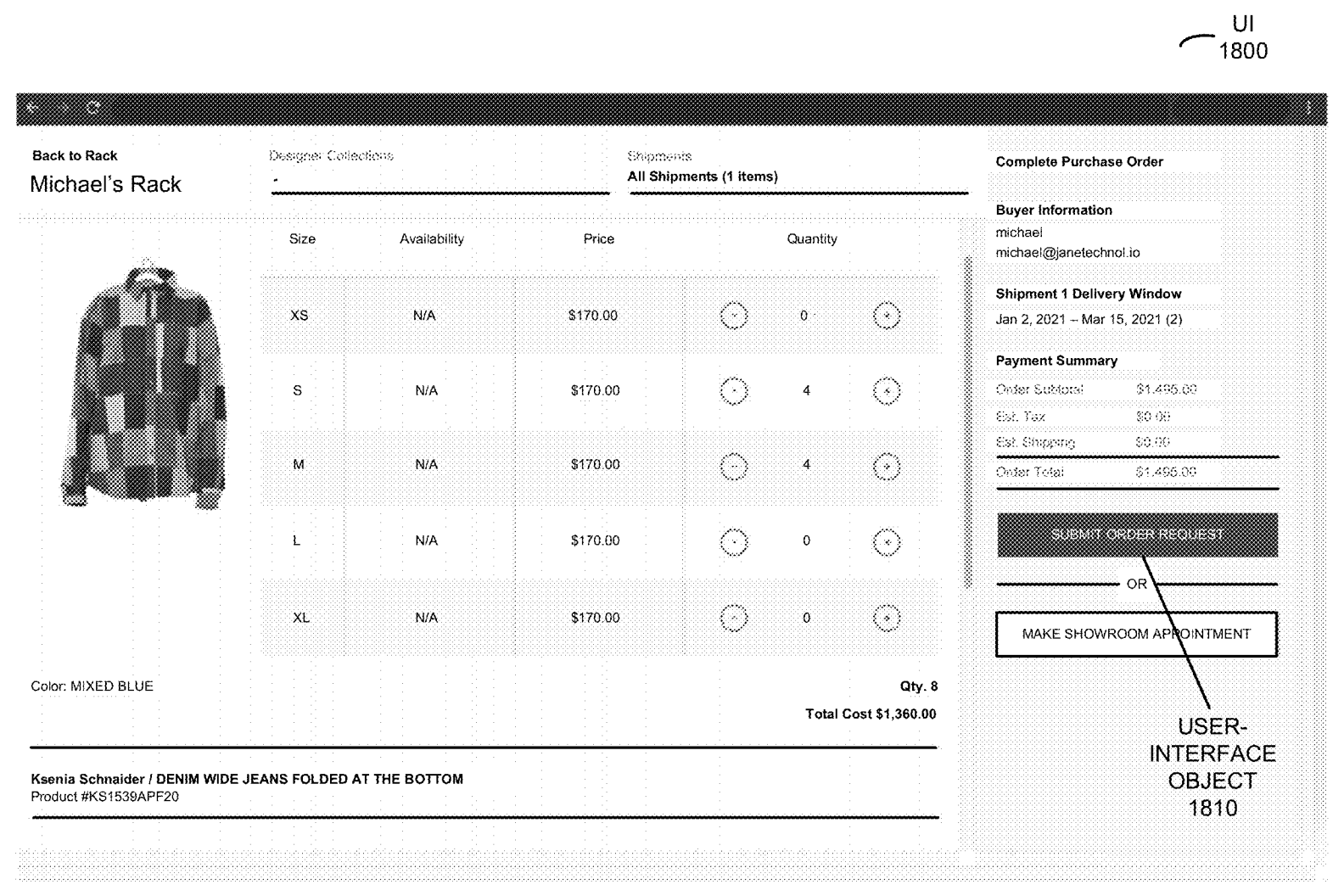
Figure 19:
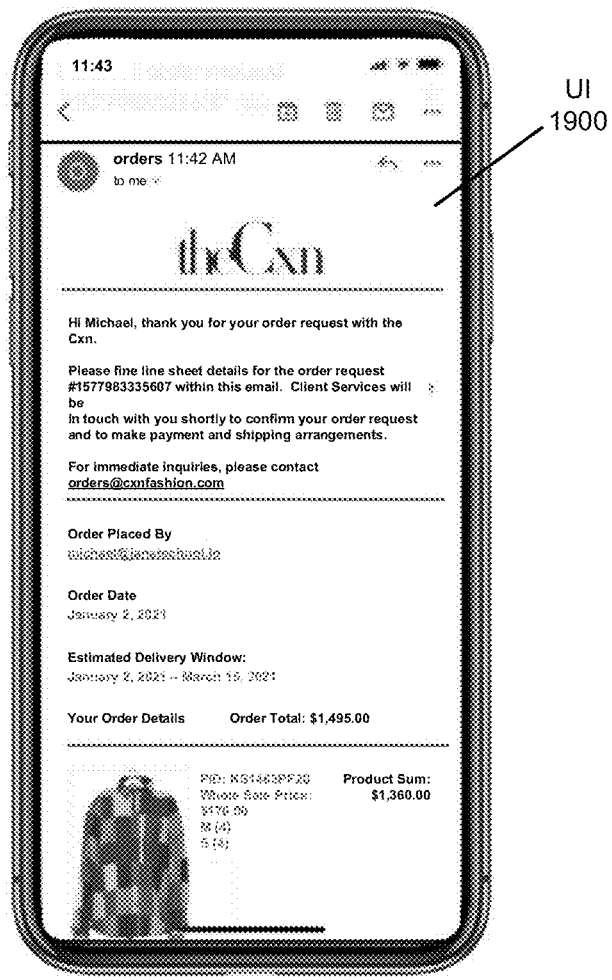

In some embodiments, the checkout-view user interfaces 1600 (FIGS. 16) and 1700 may present a payment summary 1712, such as a total cost or price. Moreover, as shown in FIG. 18, which presents an example of a user interface 1800, by activating or selecting a user-interface object 1810, the wholesale buyer may submit their order. For example, the wholesale buyer may activate a 'submit order request' object or icon. Then, as shown in FIG. 19, which presents an example of a user interface 1900, in response, a confirmation page may be presented. Alternatively or additionally, a confirmation message (such as an email or a text message) may be sent to the wholesale buyer's electronic device (such as electronic device 110-1 or a different electronic device, e.g., a cellular telephone).

Moreover, in some embodiments, after the order is submitted, a payment user interface may be presented. This may allow the wholesale buyer to provide financial information (such as bank information or credit-card information) in order to pay for the purchased fashion items.

For example, in some embodiments, when the wholesale buyer is using or interacting with any of the preceding user interfaces, the computer may provide a chat bot or video that guides the wholesale buyer through the selection and/or ordering process. Notably, the chat bot or video may answer questions about fashion items, and/or may provide information about colors, cleaning, delivery dates, etc.

Alternatively or additionally, the computer may use a predictive model that is pretrained or predetermined using a machine-learning technique (such as a supervised learning technique, an unsupervised learning technique and/or a neural network) and a training dataset with a history the wholesale buyer's previous selections and purchases (or the previous selections and purchases of other wholesale buyers, who have similar characteristics or attributes to the wholesale buyer), to make recommendations or to preselect fashion items for inclusion in clothes rack 1110 that may be of interest or relevant to the wholesale buyer. For example, the predictive model may include a classifier or a regression model that was trained using: a support vector machine technique, a classification and regression tree technique, logistic regression, LASSO, linear regression, a neural network technique (such as a convolutional neural network technique, a generative adversarial network or another type of neural network technique) and/or another linear or non-linear supervised-learning technique. During operation, the predictive model may use attributes or characteristics of the wholesale buyer and the fashion items that are currently available for selection as inputs, and may output one or more recommendations and/or one or more preselected fashion items.

In some embodiments the predictive model includes a neural network that includes convolutional blocks, arranged sequentially, followed by a softmax layer. For example, a large convolutional neural network may include, e.g., 60 M parameters and 650,000 neurons. The convolutional neural network may include, e.g., eight learned layers with weights, including, e.g., five convolutional layers and three fully connected layers with a final 1000-way softmax or normalized exponential function that produces a distribution over the 1000 class labels. Some of the convolution layers may be followed by max-pooling layers. In order to make training faster, the convolutional neural network may use non-saturating neurons (such as a local response normalization) and an efficient dual parallelized graphical processing unit (GPU) implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional neural network may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters, e.g., a 224×224×3 input file with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with, e.g., 256 kernels of size 5×5×48. Furthermore, the third, fourth, and fifth convolutional layers may be coupled to one another without any intervening pooling or normalization layers. The third convolutional layer may have, e.g., 384 kernels of size 3×3×256 coupled to the (normalized, pooled) outputs of the second convolutional layer. Additionally, the fourth convolutional layer may have, e.g., 384 kernels of size 3×3×192, and the fifth convolutional layer may have 256 kernels of size 3×3×192. The fully-connected layers may have, e.g., 4096 neurons each. Note that the numerical values in the preceding and the remaining discussion below are for purposes of illustration only, and different values may be used in other embodiments.

In some embodiments, the convolutional neural network is implemented using at least two GPUs. One GPU may run some of the layer parts while the other runs the remaining layer parts, and the GPUs may communicate at certain layers. The input of the convolutional neural network may be, e.g., 150,528-dimensional, and the number of neurons in the remaining layers in the convolutional neural network may be given by, e.g., 253, 440-186, 624-64, 896-64, 896-43, and 264-4096-4096-1000.

Moreover, while the preceding discussion illustrated the user-interface techniques with a wholesale buyer performing business-to-business purchases from a vendor, in other embodiments the user interfaces in the user-interface techniques may be used in a retail application (such as online shopping). Consequently, in other embodiments, the user of the user interface may not be a wholesale buyer. Instead, the user may be an individual, such as a consumer, who pays the retail price instead of a wholesale price.

Furthermore, in some embodiments, the user-interface techniques may be modified for use with other products, such as accessories. Notably, instead of or in addition to wearable garments (such as fashion items in the preceding discussion), the user-interface techniques may be used with jewelry, ties, handbags and/or shoes. For example, the rack-view user interface may be modified to present a virtual manikin or a virtual display case, instead of clothes rack 1110. However, the overall drag-and-drop functionality may be similar or the same.

Additionally, in some embodiments, the user-interface techniques may include avatars or simulated models, who present the fashion items (such as during video 510, e.g., in chapter 514). A given avatar or simulated model may be based at least in part on or may correspond to an actual professional model. Moreover, the given avatar or simulated model may interact with the wholesale buyer and/or may respond to user-interface activity of the wholesale buyer. For example, the given avatar or simulated model may respond to user-interface instructions or verbal requests from the wholesale buyer to model particular fashion items, to rotate or change the visual perspective of a given fashion item that is currently being modeled, to walk down a virtual runway, etc.

When responding to the user-interface instructions or verbal requests from the wholesale buyer, the given avatar or simulated model may realistically mimic the physical behaviors of the actual model on which the given avatar or simulated model is based. For example, relative to the actual professional model, the given avatar or simulated model may have a similar or a three-dimension (3D) photorealistic: walking style or gait, posture, facial expression(s), gaze direction, head position, non-verbal gestures or mannerisms (such as flicking of their hair at a certain time or location on a virtual runway), speaking style (including lexicography, tone, prosodic characteristics such as pauses and/or disfluences in speech, or another speech characteristic), etc. In these ways, the user-interface techniques may provide a realistic, dynamic or interactive virtual fashion show that accurately simulates, for the wholesale buyer, the experience of being in the same room or environment as the actual professional model. In some embodiments, the given avatar or simulated model is implemented using one or more pretrained neural networks.

While the preceding discussion illustrates the user interfaces with particular images, this is for purposes of illustration only. In other embodiments, the user interfaces may be modified to have fewer or more objects or features, different arrangements or locations of objects or features, different types of objects or features, different colors, different fonts, etc. Consequently, the disclosed user interfaces are illustrative of the functionality associated with the user-interface techniques, not the specific layout of the user interfaces used in the user-interface techniques.

We now describe embodiments of an electronic device, which may perform at least some of the operations in the user-interface techniques. FIG. 20 presents a block diagram illustrating an example of an electronic device 2000 in accordance with some embodiments. For example, electronic device may include: electronic device 110-1, computer 112, access point 116-1, or one of radio nodes 118. This electronic device may include processing subsystem 2010, memory subsystem 2012, and networking subsystem 2014. Processing subsystem 2010 includes one or more devices configured to perform computational operations. For example, processing subsystem 2010 can include one or more microprocessors, ASICs, microcontrollers, programmable-logic devices, GPUs and/or one or more digital signal processors (DSPs). Note that a given component in processing subsystem 2010 are sometimes referred to as a 'computational device.'

Memory subsystem 2012 includes one or more devices for storing data and/or instructions for processing subsystem 2010 and networking subsystem 2014. For example, memory subsystem 2012 can include dynamic random access memory (DRAM), static random access memory (SRAM), and/or other types of memory. In some embodiments, instructions for processing subsystem 2010 in memory subsystem 2012 include: program instructions or sets of instructions (such as program instructions 2022 or operating system 2024), which may be executed by processing subsystem 2010. Note that the one or more computer programs or program instructions may constitute a computer-program mechanism. Moreover, instructions in the various program instructions in memory subsystem 2012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2010.

In addition, memory subsystem 2012 can include mechanisms for controlling access to the memory. In some embodiments, memory subsystem 2012 includes a memory hierarchy that comprises one or more caches coupled to a memory in electronic device 2000. In some of these embodiments, one or more of the caches is located in processing subsystem 2010.

In some embodiments, memory subsystem 2012 is coupled to one or more high-capacity mass-storage devices (not shown). For example, memory subsystem 2012 can be coupled to a magnetic or optical drive, a solid-state drive, or another type of mass-storage device. In these embodiments, memory subsystem 2012 can be used by electronic device 2000 as fast-access storage for often-used data, while the mass-storage device is used to store less frequently used data.

Networking subsystem 2014 includes one or more devices configured to couple to and communicate on a wired and/or wireless network (i.e., to perform network operations), including: control logic 2016, an interface circuit 2018 and one or more antennas 2020 (or antenna elements). (While FIG. 20 includes one or more antennas 2020, in some embodiments electronic device 2000 includes one or more nodes, such as antenna nodes 2008, e.g., a metal pad or a connector, which can be coupled to the one or more antennas 2020, or nodes 2006, which can be coupled to a wired or optical connection or link. Thus, electronic device 2000 may or may not include the one or more antennas 2020. Note that the one or more nodes 2006 and/or antenna nodes 2008 may constitute input(s) to and/or output(s) from electronic device 2000.) For example, networking subsystem 2014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 2014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2000 may use the mechanisms in networking subsystem 2014 for performing simple wireless communication between the electronic devices, e.g., transmitting advertising or beacon frames and/or scanning for advertising frames transmitted by other electronic devices as described previously.

Within electronic device 2000, processing subsystem 2010, memory subsystem 2012, and networking subsystem 2014 are coupled together using bus 2028. Bus 2028 may include an electrical, optical, and/or electro-optical connection that the subsystems can use to communicate commands and data among one another. Although only one bus 2028 is shown for clarity, different embodiments can include a different number or configuration of electrical, optical, and/or electro-optical connections among the subsystems.

In some embodiments, electronic device 2000 includes a display subsystem 2026 for displaying information on a display, which may include a display driver and the display, such as a liquid-crystal display, a multi-touch touchscreen, etc.

Moreover, electronic device 1300 may include a user-interface subsystem 2030, such as: a mouse, a keyboard, a trackpad, a stylus, a voice-recognition interface, and/or another human-machine interface. In some embodiments, user-interface subsystem 2030 may include or may interact with a touch-sensitive display in display subsystem 2026.

Electronic device 2000 can be (or can be included in) any electronic device with at least one network interface. For example, electronic device 2000 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a radio node, a router, a switch, communication equipment, an access point, a controller, test equipment, and/or another electronic device.

Although specific components are used to describe electronic device 2000, in alternative embodiments, different components and/or subsystems may be present in electronic device 2000. For example, electronic device 2000 may include one or more additional processing subsystems, memory subsystems, networking subsystems, and/or display subsystems. Additionally, one or more of the subsystems may not be present in electronic device 2000. Moreover, in some embodiments, electronic device 2000 may include one or more additional subsystems that are not shown in FIG. 20. Also, although separate subsystems are shown in FIG. 20, in some embodiments some or all of a given subsystem or component can be integrated into one or more of the other subsystems or component(s) in electronic device 2000. For example, in some embodiments program instructions 2022 are included in operating system 2024 and/or control logic 2016 is included in interface circuit 2018.

Moreover, the circuits and components in electronic device 2000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2014 and/or electronic device 2000. The integrated circuit may include hardware and/or software mechanisms that are used for transmitting wireless signals from electronic device 2000 and receiving signals at electronic device 2000 from other electronic devices. Aside from the mechanisms herein described, radios are generally known in the art and hence are not described in detail. In general, networking subsystem 2014 and/or the integrated circuit can include any number of radios. Note that the radios in multiple-radio embodiments function in a similar way to the described single-radio embodiments.

In some embodiments, networking subsystem 2014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a cellular-telephone communication protocol (such as LTE) and/or a Wi-Fi communication protocol as an illustrative example, in other embodiments a wide variety of communication protocols and, more generally, wireless communication techniques may be used. For example, the communication protocol in a WLAN may use OFDMA. Thus, the user-interface techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the user-interface techniques may be implemented using program instructions 2022, operating system 2024 (such as a driver for interface circuit 2018) or in firmware in interface circuit 2018. Thus, the user-interface techniques may be implemented at runtime of program instructions 2022. Alternatively or additionally, at least some of the operations in the user-interface techniques may be implemented in a physical layer, such as hardware in interface circuit 2018.

In the preceding description, we refer to 'some embodiments.' Note that 'some embodiments' describes a subset of all of the possible embodiments, but does not always specify the same subset of embodiments. Moreover, note that the numerical values provided are intended as illustrations of the user-interface techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   an interface circuit configured to communicate with an electronic device;
   a computation device coupled to the interface circuit;
   memory, coupled to the computation device, configured to store program instructions, wherein, when executed by the computation device, the program instructions cause the computer to perform operations comprising:
   receiving, via the interface circuit, information corresponding to first user-interface activity associated with the electronic device, wherein the user-interface activity indicates selections of a wholesale buyer of fashion items in a first user interface; and
   generating instructions for a second user interface based at least in part on the first user-interface activity, wherein the second user interface corresponds to a virtual showroom of the wholesale buyer, wherein the second user interface comprises information that represents the selected fashion items and a virtual clothes rack with available hangers, and wherein the second user interface is configured to allow the wholesale buyer to dynamically and virtually assemble one or more groups of the selected fashion items on one or more of the available hangers; and
   providing, via the interface circuit, the instructions for the second user interface addressed to the electronic device, wherein the second user interface is configured to provide a virtual showroom experience that corresponds to a real-world showroom experience of the wholesale buyer by allowing the wholesale buyer to virtually assemble one or more outfits that provide a fashion story or narrative for a store or a retail establishment based at least in part on the one or more groups of selected fashion items and associated attributes of the one or more groups of selected fashion items, which comprise delivery dates or ranges of delivery dates of the one or more groups of selected fashion items, wherein the one or more groups of selected fashion items are initially included in a holding area in the second user interface and are grouped or arranged in the holding area based at least in part on the delivery dates or the ranges of delivery dates, and wherein the second user interface reduces the time needed to assemble the one or more outfits and use of resources in the computer.

2. The computer of claim 1, wherein the second user-interface is configured to allow a given selected fashion item to be picked, and to drag and drop the given selected fashion item onto a first hanger in the available hangers on the clothes rack.

3. The computer of claim 2, wherein the second user-interface is configured to allow the given selected fashion item to be moved from the first hanger to a second hanger in the available hangers.

4. The computer of claim 1, wherein the second user interface is configured to allow a view or a perspective of a given selected fashion item to be changed.

5. The computer of claim 1, wherein the second user interface is configured to allow customization of a background in the second user interface; and wherein the customization of the background comprises acquiring, via a camera in the electronic device or a second electronic device, an image that is subsequently used as the background.

6. The computer of claim 1, wherein the second user interface comprises a user-interface object configured to facilitate review of a purchase order;

wherein the operations comprise:
receiving, via the interface circuit, second user-interface activity associated with the electronic device that indicates activation of the user-interface object;
generating instructions for a third user interface based at least in part on the second user-interface activity, wherein the third user interface summarizes the purchase order of the wholesale buyer, and wherein the purchase order comprises the fashion items in the one or more groups of the selected fashion items and purchase information about the fashion items in the one or more groups of the selected fashion items; and
providing, via the interface circuit, the instructions for the third user interface addressed to the electronic device.

7. The computer of claim 6, wherein the purchase information comprises sizes, colors and the delivery dates or the ranges of delivery dates for the fashion items in the one or more groups of the selected fashion items.

8. The computer of claim 7, wherein the third user interface is configured to allow the purchase information for a given fashion item in the one or more groups of the selected fashion items to be modified.

9. The computer of claim 6, wherein the fashion items in the one or more groups of the selected fashion items in the third user interface are arranged or grouped based at least in part on the delivery dates or the ranges of delivery dates.

10. The computer of claim 6, wherein the third user interface comprises a second user-interface object configured to submit the purchase order; and wherein the operations comprise:
receiving, via the interface circuit, third user-interface activity associated with the electronic device that indicates activation of the second user-interface object;
submitting, based at least in part on the third user-interface activity, the purchase order; and
providing, via the interface circuit, an acknowledgement of the purchase order addressed to the electronic device or a second electronic device.

11. The computer of claim 1, wherein the operations comprise recommending or selecting, independent of the user-interface activity, additional fashion items for inclusion in the second user interface based at least in part on a purchase history of fashion items of the wholesale buyer, attributes of the additional fashion items and a pretrained predictive model;

wherein the additional fashion items are different from the one or more groups of selected fashion items;
wherein the attributes of the additional fashion items comprise second delivery dates or second ranges of delivery dates of the additional fashion items; and
wherein the second user interface comprises the additional fashion items.

12. A non-transitory computer-readable storage medium for use in conjunction with a computer, the computer-readable storage medium configured to store program instructions that, when executed by the computer, causes the computer to perform operations comprising:

receiving information corresponding to first user-interface activity associated with an electronic device, wherein the user-interface activity indicates selections of a wholesale buyer of fashion items in a first user interface; and
generating instructions for a second user interface based at least in part on the first user-interface activity, wherein the second user interface corresponds to a virtual showroom of the wholesale buyer, wherein the second user interface comprises information that represents the selected fashion items and a virtual clothes rack with available hangers, and wherein the second user interface is configured to allow the wholesale buyer to dynamically and virtually assemble one or more groups of the selected fashion items on one or more of the available hangers; and
providing the instructions for the second user interface addressed to the electronic device, wherein the second user interface provides a virtual showroom experience that corresponds to a real-world showroom experience of the wholesale buyer by allowing the wholesale buyer to virtually assemble one or more outfits that provide a fashion story or narrative for a store or a retail establishment based at least in part on the one or more groups of selected fashion items and associated attributes of the one or more groups of selected fashion items, which comprise delivery dates or ranges of delivery dates of the one or more groups of selected fashion items, wherein the one or more groups of selected fashion items are initially included in a holding area in the second user interface and are grouped or arranged in the holding area based at least in part on the delivery dates or the ranges of delivery dates, and wherein the second user interface reduces the time needed to assemble the one or more outfits and use of resources in the computer.

13. The computer-readable storage medium of claim 12, wherein the second user-interface is configured to allow a given selected fashion item to be picked, and to drag and drop the given selected fashion item onto a first hanger in the available hangers on the clothes rack.

14. The computer-readable storage medium of claim 12, wherein the second user interface comprises a user-interface object configured to facilitate review of a purchase order;
   wherein the operations comprise:
      receiving second user-interface activity associated with the electronic device that indicates activation of the user-interface object;
      generating instructions for a third user interface based at least in part on the second user-interface activity, wherein the third user interface summarizes the purchase order of the wholesale buyer, and wherein the purchase order comprises the fashion items in the one or more groups of the selected fashion items and purchase information about the fashion items in the one or more groups of the selected fashion items; and
      providing the instructions for the third user interface addressed to the electronic device.

15. A method for simulating a showroom experience for a wholesale buyer, comprising:
   by a computer:
   receiving information corresponding to first user-interface activity associated with an electronic device, wherein the user-interface activity indicates selections of the wholesale buyer of fashion items in a first user interface; and
   generating instructions for a second user interface based at least in part on the first user-interface activity, wherein the second user interface corresponds to a virtual showroom of the wholesale buyer, wherein the second user interface comprises information that represents the selected fashion items and a virtual clothes rack with available hangers, and wherein the second user interface is configured to allow the wholesale buyer to dynamically and virtually assemble one or more groups of the selected fashion items on one or more of the available hangers; and
   providing the instructions for the second user interface addressed to the electronic device, wherein the second user interface provides a virtual showroom experience that corresponds to a real-world showroom experience of the wholesale buyer by allowing the wholesale buyer to virtually assemble one or more outfits that provide a fashion story or narrative for a store or a retail establishment based at least in part on the one or more groups of selected fashion items and associated attributes of the one or more groups of selected fashion items, which comprise delivery dates or ranges of delivery dates of the one or more groups of selected fashion items,
   wherein the one or more groups of selected fashion items are initially included in a holding area in the second user interface and are grouped or arranged in the holding area based at least in part on the delivery dates or the ranges of delivery dates, and
   wherein the second user interface reduces the time needed to assemble the one or more outfits and use of resources in the computer.

16. The method of claim 15, wherein the second user-interface is configured to allow a given selected fashion item to be picked, and to drag and drop the given selected fashion item onto a first hanger in the available hangers on the clothes rack.

17. The method of claim 15, wherein the method comprises recommending or selecting, independent of the user-interface activity, additional fashion items for inclusion in the second user interface based at least in part on a purchase history of fashion items of the wholesale buyer, attributes of the additional fashion items and a pretrained predictive model;
   wherein the additional fashion items are different from the one or more groups of selected fashion items;
   wherein the attributes of the additional fashion items comprise second delivery dates or second ranges of delivery dates of the additional fashion items; and
   wherein the second user interface comprises the additional fashion items.

18. The method of claim 15, wherein the second user interface comprises a user-interface object configured to facilitate review of a purchase order;
   wherein the method comprises:
      receiving, via the interface circuit, second user-interface activity associated with the electronic device that indicates activation of the user-interface object;
      generating instructions for a third user interface based at least in part on the second user-interface activity, wherein the third user interface summarizes the purchase order of the wholesale buyer, and wherein the purchase order comprises the fashion items in the one or more groups of the selected fashion items and purchase information about the fashion items in the one or more groups of the selected fashion items; and
      providing, via the interface circuit, the instructions for the third user interface addressed to the electronic device.

19. The method of claim 18, wherein the fashion items in the one or more groups of the selected fashion items in the third user interface are arranged or grouped based at least in part on the delivery dates or the ranges of delivery dates.

20. The computer-readable storage medium of claim 12, wherein the operations comprise recommending or selecting, independent of the user-interface activity, additional fashion items for inclusion in the second user interface based at least in part on a purchase history of fashion items of the wholesale buyer, attributes of the additional fashion items and a pretrained predictive model;
   wherein the additional fashion items are different from the one or more groups of selected fashion items;
   wherein the attributes of the additional fashion items comprise second delivery dates or second ranges of delivery dates of the additional fashion items; and
   wherein the second user interface comprises the additional fashion items.

\* \* \* \* \*